United States Patent
Miyazaki et al.

(10) Patent No.: US 10,272,902 B2
(45) Date of Patent: Apr. 30, 2019

(54) BRAKE CONTROL DEVICE

(75) Inventors: Tetsuya Miyazaki, Toyota (JP);
Kazunori Nimura, Toyota (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 537 days.

(21) Appl. No.: 13/393,937

(22) PCT Filed: Sep. 2, 2009

(86) PCT No.: PCT/JP2009/004334
§ 371 (c)(1),
(2), (4) Date: Mar. 2, 2012

(87) PCT Pub. No.: WO2011/027393
PCT Pub. Date: Mar. 10, 2011

(65) Prior Publication Data
US 2012/0158266 A1    Jun. 21, 2012

(51) Int. Cl.
*B60L 7/18* (2006.01)
*B60W 30/18* (2012.01)
(Continued)

(52) U.S. Cl.
CPC .............. *B60W 20/13* (2016.01); *B60L 7/18* (2013.01); *B60L 7/26* (2013.01); *B60L 11/123* (2013.01); *B60L 11/14* (2013.01); *B60T 8/4081* (2013.01); *B60W 10/08* (2013.01); *B60W 10/18* (2013.01); *B60W 10/184* (2013.01); *B60W 30/18109* (2013.01); *B60W 30/18127* (2013.01);
(Continued)

(58) Field of Classification Search
CPC ............. B60T 2270/604; B60W 20/00; B60W 30/18127

USPC .......................................................... 701/70
See application file for complete search history.

(56) References Cited

U.S. PATENT DOCUMENTS

| 6,033,041 A * | 3/2000 | Koga ........................ B60L 7/12 188/159 |
| 2003/0080614 A1* | 5/2003 | Soga ........................ B60K 6/44 303/152 |

(Continued)

FOREIGN PATENT DOCUMENTS

| JP | 6-1220 | 1/1994 |
| JP | 11 004503 | 1/1999 |

(Continued)

OTHER PUBLICATIONS

International Search Report dated Dec. 8, 2009 in PCT/JP09/004334 filed on Sep. 2, 2009.

*Primary Examiner* — Charles J Han
(74) *Attorney, Agent, or Firm* — Oblon, McClelland, Maier & Neustadt, L.L.P.

(57) ABSTRACT

A brake control system includes: a friction brake unit configured to generate a friction braking force; a regenerative brake unit configured to generate a regenerative braking force; and a brake control unit configured to control the regenerative brake unit and the friction brake unit based on a regenerative target value and a friction target value based on a target braking force, which is a target of the braking force to be provided to a wheel. The brake control unit controls the regenerative brake unit based on a second regenerative target value larger than a first regenerative target value that has been defined based on the target braking force.

8 Claims, 11 Drawing Sheets

(51) Int. Cl.
*B60L 7/26* (2006.01)
*B60L 11/12* (2006.01)
*B60L 11/14* (2006.01)
*B60T 8/40* (2006.01)
*B60W 10/08* (2006.01)
*B60W 10/184* (2012.01)
*B60W 20/00* (2016.01)
*B60K 6/445* (2007.10)
*B60W 20/13* (2016.01)
*B60W 10/18* (2012.01)

(52) U.S. Cl.
CPC ......... *B60K 6/445* (2013.01); *B60L 2240/423* (2013.01); *B60L 2240/486* (2013.01); *B60T 2270/604* (2013.01); *B60W 20/00* (2013.01); *B60W 2710/083* (2013.01); *B60W 2710/105* (2013.01); *B60W 2720/30* (2013.01); *Y02T 10/6217* (2013.01); *Y02T 10/6239* (2013.01); *Y02T 10/642* (2013.01); *Y02T 10/7077* (2013.01)

(56) References Cited

U.S. PATENT DOCUMENTS

2004/0054450 A1   3/2004  Nakamura et al.
2010/0127562 A1*  5/2010  Yokoyama ............... B60T 1/10
                                                303/151

FOREIGN PATENT DOCUMENTS

| JP | 11 032404 | 2/1999 |
| JP | 2001 16703 | 1/2001 |
| JP | 2001016703 A * | 1/2001 |
| JP | 2001 145205 | 5/2001 |
| JP | 2004 155403 | 6/2004 |
| JP | 2006 205912 | 8/2006 |
| JP | 2008 306815 | 12/2008 |
| WO | WO-2008149197 A1 * | 12/2008 | ............. B60K 6/445 |

* cited by examiner

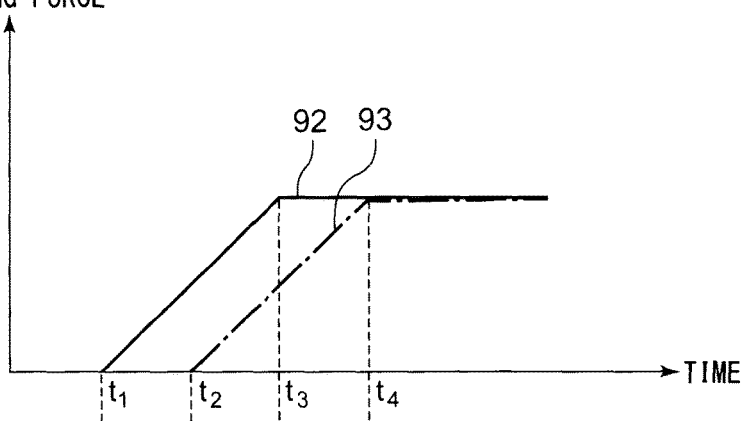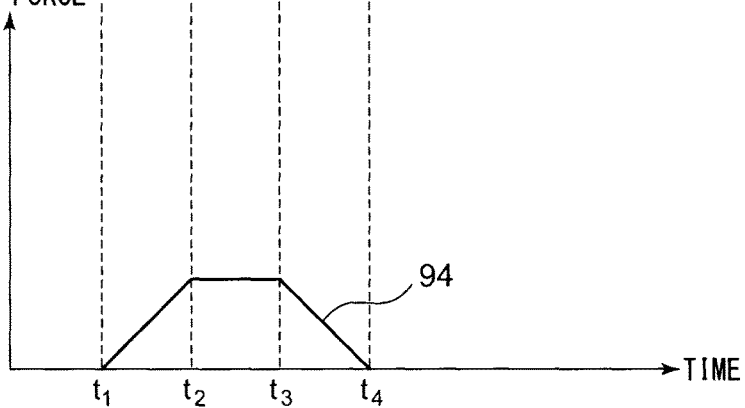

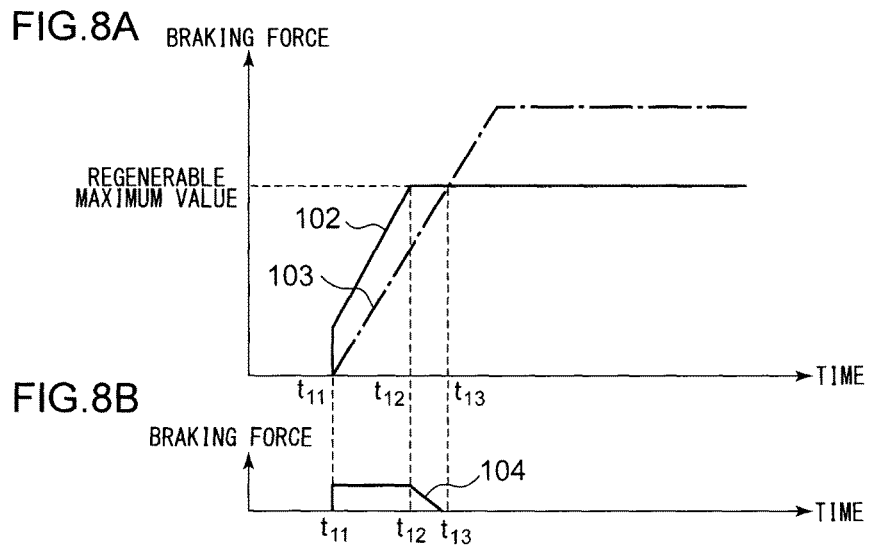
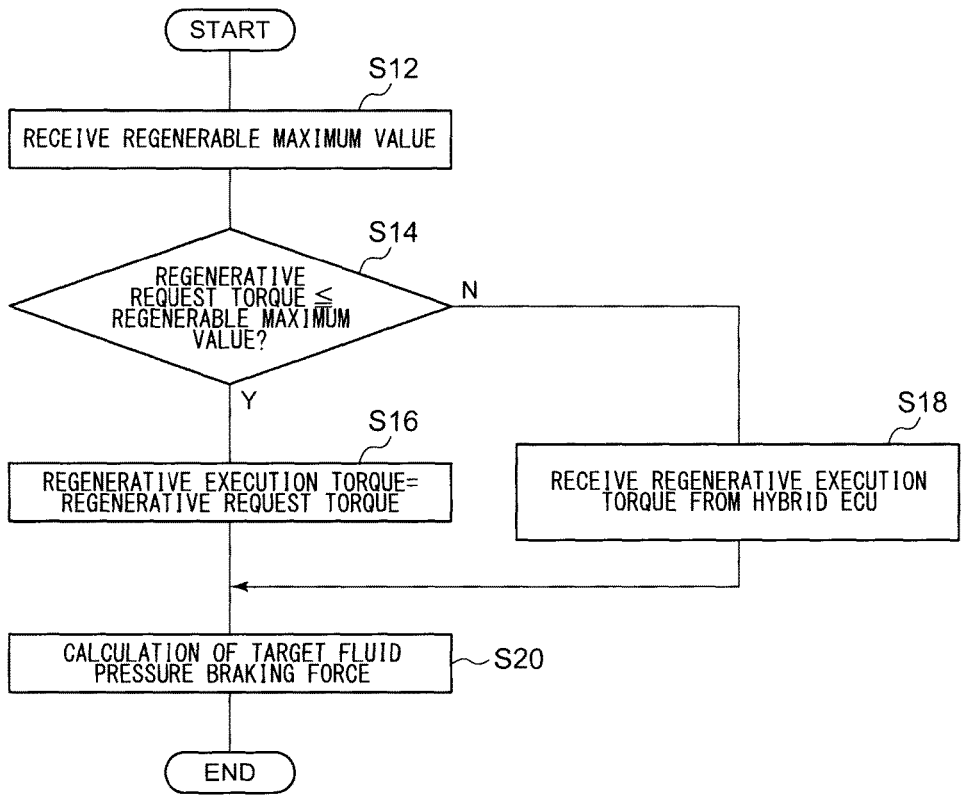

BRAKE CONTROL DEVICE

TECHNICAL FIELD

The present invention relates to a brake control system configured to control a braking force to be provided to the wheel provided in a vehicle.

BACKGROUND ART

The brake systems have been conventionally known in each of which a required braking force, defined in accordance with an operation amount of a brake pedal by a driver, is achieved by the cooperation of regenerative braking and fluid pressure braking (see, for example, Patent Document 1).

In Patent Document 1, a cooperative control system of a brake with a combination system in which a regenerative brake system and a fluid pressure brake system are both provided is described. In the system, when a vehicle is being brought to a halt, regenerative braking torque is gradually reduced and fluid pressure braking torque is gradually increased, under a total braking torque command value required by a driver. In this case, by compensating, with the regenerative braking torque, the difference between a command value and an actual value of the braking force directed to the fluid pressure brake system whose response is late, a total braking torque actual value is made equal to the total braking torque command value.

[Patent Document]

[Patent Document 1] Japanese Patent Application Publication No. 2004-155403

DISCLOSURE OF THE INVENTION

Problem to be Solved by the Invention

In regenerative braking, a request for regeneration is transmitted from a brake ECU (Electronic Control Unit) to a hybrid ECU, and then the hybrid ECU executes the regenerative braking based on the request. Because the regenerative braking is used for improving the fuel consumption of a vehicle, it is desirable to utilize the regenerative braking at a maximum. However, there is sometimes the case where a divergence is caused between a target value and an execution value of the regeneration due to a processing delay of the communication between the brake ECU and the hybrid ECU, etc. If the response of an execution value of the regeneration is delayed, a braking force corresponding to the delay is distributed to the fluid pressure braking based on the execution value with respect to the target value of the previous time, and hence the braking force is sometimes converted into a friction energy without being regenerated.

Accordingly, a purpose of the present invention is to provide a brake control system in which the fuel consumption of a vehicle is improved by efficiently using regenerative braking.

Means for Solving the Problem

In order to solve the aforementioned problem, a brake control system according to an embodiment of the present invention comprises: a friction brake unit configured to generate a friction braking force; a regenerative brake unit configured to generate a regenerative braking force; and a brake control unit configured to control the regenerative brake unit and the friction brake unit based on a regenerative target value and a friction target value based on a target braking force, which is a target of the braking to force to be provided to a wheel. The brake control unit controls the regenerative brake unit based on a second regenerative target value larger than a first regenerative target value that has been defined based on the target braking force.

Usually, the first regenerative target value is calculated based on the target braking force, and the regenerative brake unit executes regenerative braking based on the first regenerative target value, so that a friction target value is calculated by subtracting the executed regenerative execution value from the target braking force. There is the possibility that a lag may be caused between the first regenerative target value and the regenerative execution value due to a response delay, such as a lag in a control cycle, a delay in communication, or the like. According to this embodiment, the regenerative brake unit can be controlled, by the second regenerative target value larger than the first regenerative target value, so as to compensate a lag occurring due to a response delay between the first regenerative target value and the regenerative execution value, thereby allowing the fuel consumption of a vehicle to be improved by efficiently using the regenerative braking.

When the first regenerative target value is on the increase, the brake control unit may control the regenerative brake unit based on the second regenerative target value. Thereby, the first regenerative target value can be made large when the regenerative braking is initiated and when the brake pedal is stepped on again, etc. Accordingly, a sense of discomfort in a brake feeling can be reduced in comparison with the case where the first regenerative target value is on the decrease.

The brake control unit may calculate the second regenerative target value by inflating the first regenerative target value based on an inflation value that is set in accordance with the gradient of the target braking force. For example, when the speed at which the brake pedal is stepped on is relatively slow, a driver sometimes feels a sense of discomfort in a brake feeling if an inflation value by which the first regenerative target value is inflated is set to be relatively large. Accordingly, a brake feeling can be made good by setting the inflation value in accordance with the gradient of the target braking force.

The brake control unit may adjust the inflation value based on vehicle speed. When the vehicle speed is relatively low, a driver sometimes feels a sense of discomfort in the brake feeling if the first regenerative target value is inflated too greatly. By adjusting the inflation value based on vehicle speed, a brake feeling can be made good, and further a regenerative energy can be recovered efficiently.

When a predetermined period of time has elapsed after the inflation of the first regenerative target value was initiated, the brake control unit may reduce the inflation value. Thereby, the first regenerative target value can be inflated in accordance with the response delay between the regenerative target value and the regenerative execution value.

The brake control unit may supply the regenerative target value to a regenerative control unit to control the regenerative brake unit via the regenerative control unit, so that the friction target value is calculated based on both the target braking force and the regenerative execution value at which the regenerative brake unit has executed based on the regenerative target value. The brake control unit may receive, from the regenerative control unit, a regenerable maximum value, which indicates the maximum value at which braking can be executed by the regenerative brake unit, and may takes the regenerative target value as the regenerative execution value when the regenerative target value, which is to be supplied to the regenerative control unit, is smaller than or equal to the regenerable maximum value. By determining, based on the regenerable maximum value indicating the maximum value at which braking can be executed by the regenerative brake unit, whether the regenerative target value can be used as the regenerative execution value, that is, whether the regenerative brake unit will sufficiently execute the regenerative target value, reliability can be provided to the fact that the regenerative target value is assumed to be the regenerative execution value. Thereby, the friction target value can be calculated by using the regenerative target value having high execution reliability as the regenerative execution value.

When the regenerative target value of this time is smaller than the regenerative execution value of the previous time by a predetermined threshold value or more, the brake control unit may take the regenerative target value of this time as the regenerative execution value of this time. The execution reliability of the regenerative target value can be enhanced by sufficiently executing the regenerative target value as the regenerative braking when the regenerative target value is not larger than the regenerative execution value of the previous time by the predetermined threshold value or more.

When determining that the regenerative execution value of the previous time is equal to the regenerative target value supplied to the regenerative control unit in the past within a predetermined period of time, the brake control unit may take the regenerative target value as the regenerative execution value. Thereby, it can be determined that the regenerative braking at the control cycle of the previous time has been executed normally, and hence the execution reliability of the regenerative target value can be enhanced.

The brake control unit may execute a gradually changing process so as to reduce the difference between the regenerative execution value of this time and that of the previous time, so that the friction target value is calculated based on the regenerative execution value obtained by interpolating the regenerative execution value of this time and that of the previous time with the gradually changing process. Thereby, the difference between before and after the regenerative execution value can be reduced and a braking feeling can be made good.

Advantage of the Invention

According to the present invention, the fuel consumption of a vehicle can be improved by efficiently using regenerative braking.

BRIEF DESCRIPTION OF THE DRAWINGS

FIGS. 4(a) and 4(b) are graphs illustrating a divergence between conventional regenerative request torque and regenerative execution torque;

FIGS. 8(a) and 8(b) are graphs for explaining a process for reducing the inflation value according to the embodiment;

FIG. 9 is a flowchart illustrating the procedure for calculating the target fluid pressure braking force according to the embodiment;

REFERENCE NUMERALS

1 VEHICLE
2 ENGINE
3 POWER DIVISION MECHANISM
4 MOTOR GENERATOR
5 TRANSMISSION
6 ELECTRIC MOTOR
7 HYBRID ECU
8 DRIVE SHAFT
9FL LEFT FRONT WHEEL
9FR RIGHT FRONT WHEEL
10 REGENERATIVE BRAKE UNIT
11 POWER CONVERTER
12 BATTERY
13 ENGINE ECU
14 MOTOR ECU
20 FLUID PRESSURE BRAKE UNIT
21RR, 21RL, 21FR, 21FL DISC BRAKE UNIT
22 BRAKE DISC
23RR, 23RL, 23FR, 23FL WHEEL CYLINDER
24 BRAKE PEDAL
25 STROKE SENSOR
27 MASTER CYLINDER UNIT
30 POWER FLUID PRESSURE SOURCE
31 FLUID PRESSURE BOOSTER
32 MASTER CYLINDER
33 REGULATOR
34 RESERVOIR
35 ACCUMULATOR
35a RELIEF VALVE
36 PUMP
36a MOTOR
37 MASTER PIPE
38 REGULATOR PIPE
39 ACCUMULATOR PIPE
40 FLUID PRESSURE ACTUATOR
41, 42, 43, 44 INDIVIDUAL CHANNEL
45 MAIN CHANNEL
45a FIRST CHANNEL
45b SECOND CHANNEL
46 PRESSURE-REDUCING CHANNEL
51 ELECTROMAGNETIC CONTROL VALVE
51 ABS HOLDING VALVE
55 RESERVOIR CHANNEL

56 ABS PRESSURE-REDUCING VALVE
60 ISOLATION VALVE
61 MASTER CHANNEL
62 REGULATOR CHANNEL
63 ACCUMULATOR CHANNEL
64 MASTER CUT VALVE
65 REGULATOR CUT VALVE
66 PRESSURE-INCREASING LINEAR CONTROL VALVE
67 PRESSURE-REDUCING LINEAR CONTROL VALVE
68 SIMULATOR CUT VALVE
69 STROKE SIMULATOR
70 BRAKE ECU
71 REGULATOR PRESSURE SENSOR
71 PRESSURE SENSOR
72 ACCUMULATOR PRESSURE SENSOR
73 CONTROL PRESSURE SENSOR
77 RESERVOIR PIPE
81 TARGET DECELERATION CALCULATION UNIT
82 TARGET BRAKING FORCE CALCULATION UNIT
83 REGENERATIVE REQUEST TORQUE CALCULATION UNIT
84 CAN TRANSMISSION UNIT
85 REGENERATIVE EXECUTION UNIT
86 CAN TRANSMISSION UNIT
87 CAN RECEIVING UNIT
88 REGENERATIVE EXECUTION BRAKING FORCE CALCULATION UNIT
89 TARGET FLUID PRESSURE CALCULATION UNIT

BEST MODE FOR CARRYING OUT THE INVENTION

Figure 1:
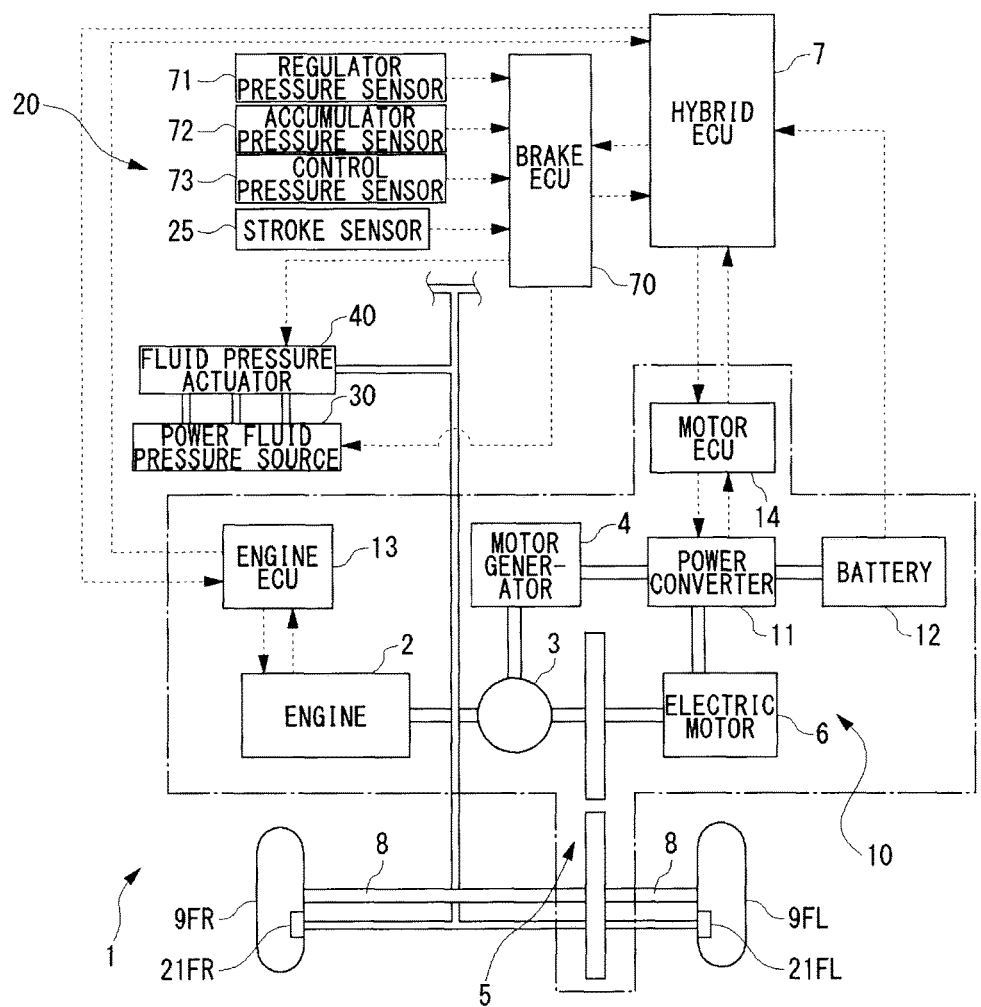
FIG. 1 is a view illustrating the schematic configuration of a vehicle to which a brake control system according to an embodiment is applied.

FIG. 1 is a view illustrating the schematic configuration of a vehicle to which a brake control system according to an embodiment is applied. The vehicle 1 illustrated in the view is formed as a so-called hybrid vehicle, and comprises: an engine 2; a 3-shaft power division mechanism 3 connected to a crankshaft, an output axis of the engine 2; a motor generator 4 by which power can be generated, connected to the power division mechanism 3; an electric motor 6 connected to the power division mechanism 3 via a transmission 5; and an electronic control unit 7 for a hybrid vehicle (hereinafter, referred to as a "hybrid ECU", and every electronic control unit is referred to as an "ECU"), which controls the whole drive system of the vehicle 1. A right front wheel 9FR and a left front wheel 9FL, which are drive wheels of the vehicle 1, are connected to the transmission 5 via a drive shaft 8. Herein, the hybrid ECU corresponds to a regenerative control unit.

A brake ECU 70 controls a regenerative brake unit 10 and a friction brake unit based on both a regenerative target value and a friction target value based on a target braking force. The total of the regenerative target value and the friction target value may be equal to the target braking force.

The engine 2 is an internal combustion engine operated by using a hydrocarbon fuel, such as, for example, gasoline, gas oil, or the like, and is controlled by an engine ECU 13. The engine ECU 13 can communicate with the hybrid ECU 7, and executes a fuel injection control, an ignition control, and an intake control, etc., of the engine 2 based on a control signal from the hybrid ECU 7 and signals from various sensors for detecting operating states of the engine 2. The engine ECU 13 provides information on the operating states of the engine 2 to the hybrid ECU, if necessary.

The power division mechanism 3 plays: the role of communicating the output of the electric motor 6 to the right and left front wheels 9FR and 9FL via the transmission 5; the role of distributing the output of the engine 2 to the motor generator 4 and the transmission 5; and the role of decelerating or accelerating the rotational speed of the electric motor 6 or the engine 2. Each of the motor generator 4 and the electric motor 6 is connected to a battery 12 via a power converter 11 including an inverter, and a motor ECU 14 is connected to the power converter 11. A storage battery, such as, for example, a nickel-hydrogen storage battery, can be used as the battery 12. The motor ECU 14 can also communicate with the hybrid ECU 7 and controls, via the power converter 11, the motor generator 4 and the electric motor 6 based on a control signal from the hybrid ECU 7, etc. Each of the aforementioned hybrid ECU 7, engine ECU 13, and motor ECU 14 is formed as a microprocessor including a CPU, and includes a ROM for storing various programs, a RAM for temporarily storing data, an input/output port, and a communication port, etc., in addition to the CPU.

The right and left front wheels 9FR and 9FL can be driven by an output of the electric motor 6 under the control of the hybrid ECU 7 and the motor ECU 14, while power is being supplied from the battery 12 to the electric motor 6 via the power converter 11. The vehicle 1 is driven by the engine 2 in an operating area where the engine operates at a good efficiency. At the time, by communicating part of the output of the engine 2 to the motor generator 4 via the power division mechanism 3, it becomes possible to drive the electric motor 6 by using the power generated by the motor generator 4 or to charge the battery 12 via the power converter 11.

While the vehicle 1 is being braked, the electric motor 6 is rotated by the power communicated from the front wheels 9FR and 9FL under the control of the hybrid ECU and the motor ECU 14, so that the electric motor 6 is operated as a power generator. That is, the electric motor 6, the power converter 11, the hybrid ECU 7, and the motor ECU 14, etc., function as the regenerative unit 10 that provides a braking force to the right and left front wheels 9FR and 9FL by regenerating the kinetic energy of the vehicle 1 to an electric energy.

The brake control system according to the embodiment generates a required braking force by executing a brake regeneration cooperative control in which the regenerative braking force and the friction braking force are used in combination. The regenerative braking force means a braking force provided to a wheel by operating an electric motor for driving the wheel as a power generator in which the rotating torque of a moving wheel is inputted. The kinetic energy of a vehicle is converted into an electric energy, and the electric energy is accumulated in the storage battery by being communicated from the electric motor via the power converter including an inverter. The accumulated electric energy is used for the subsequent drive of wheels, etc., thereby contributing to the improvement in the fuel consumption of a vehicle. On the other hand, the friction braking force means a braking force provided to a wheel by pressing a friction member against a rotating member that is rotated with the wheel. Hereinafter, the fluid pressure braking force generated by pressing the friction member against the rotating member with the supply of an operating fluid from a fluid pressure source will be described as an example of the friction braking force. In order to improve the fuel consumption to a higher level, it is desirable to preferentially use a regenerative braking force and to complementarily generate, by a fluid pressure braking force, a braking force corresponding to a shortage for the required braking force, occurring when only the regenerative braking force is used.

Figure 2:
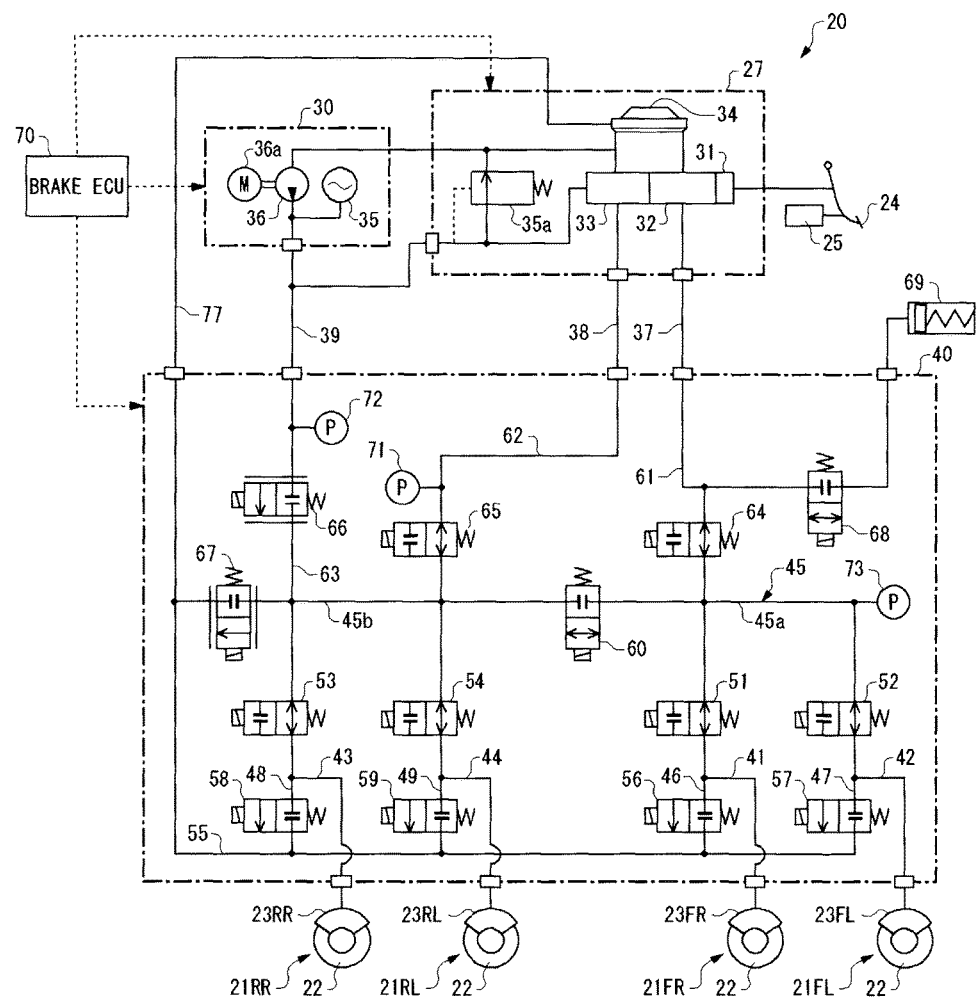
FIG. 2 is a view illustrating the system of a fluid pressure brake unit according to the embodiment.

As illustrated in FIG. 2, the vehicle 1 comprises a fluid pressure brake unit 20 (which corresponding to the "friction brake unit") configured to generate a braking force by supplying the operating fluid from a power fluid pressure source 30, etc., in addition to the regenerative brake unit 20. In the vehicle 1, a desired braking force can be generated by using the regenerative braking force and the fluid pressure braking force in combination, with a brake regeneration cooperative control being executed.

FIG. 2 is a view illustrating the system of the fluid pressure brake unit 20 according to the embodiment. As illustrated in FIG. 2, the fluid pressure brake unit 20 includes: disc brake units 21FR, 21FL, 21RR, and 21RL, all of which are provided to correspond to respective wheels; a master cylinder unit 27, the power fluid pressure source 30; and a fluid pressure actuator 40.

The disc brake units 21FR, 21FL, 21RR, and 21RL provide braking forces to the right front wheel, left front wheel, right rear wheel, and left rear wheel of the vehicle, respectively. The master cylinder unit 27 according to the present embodiment, as a manual fluid pressure source, sends out brake fluid to the disc brake units 21FR to 21RL, the pressure of the brake fluid being increased in accordance with an operation amount of a brake pedal 24, as a brake operating member, by a driver. The power fluid pressure source 30 can send out, to the disc brake units 21FR to 21RL, the brake fluid as an operating fluid independently of the operation of the brake pedal 24 by a driver, the pressure of the brake fluid being increased by the supply of power. The fluid pressure actuator 40 appropriately adjusts the pressure of the brake fluid supplied from the power fluid pressure source 30 or the master cylinder unit 27, and sends out the brake fluid to the disc brake units 21FR to 21RL. Thereby, the fluid pressure braking force for each wheel can be adjusted.

Hereinafter, each of the disc brake units 21FR to 21RL, the master cylinder unit 27, the power fluid pressure source 30, and the fluid pressure actuator 40 will be described in more detail. The disc brake units 21FR to 21RL include a brake disk 22 and the wheel cylinders 23FR to 23RL built into a brake caliper, respectively. Each of the wheel cylinders 23FR to 23RL is connected to the fluid pressure actuator 40 via a fluid channel different from that for another wheel cylinder. Hereinafter, the wheel cylinders 23FR to 23RL will be collectively referred to as a "wheel cylinder 23".

In each of the disc brake units 21FR to 21RL, a brake pad, as the friction member, is pressed against the brake disk 22 that is rotated with the wheel, when the brake fluid is supplied from the fluid pressure actuator 40 to the wheel cylinder 23. Thereby, a braking force id provided to each wheel. In the embodiment, the disk brake units 21FR to 21RL are used; however, another braking force providing mechanism including the wheel cylinder 23, such as, for example, a drum brake, may be used.

In the present embodiment, the master cylinder unit 27 is a master cylinder with a fluid pressure booster and includes a fluid pressure booster 31, a master cylinder 32, a regulator 33, and a reservoir 34. The fluid pressure booster 31 is connected to the brake pedal 24 to communicate a pedal tread force applied onto the brake pedal 24 after amplifying the tread force. By the brake fluid being supplied from the power fluid pressure source 30 to the fluid pressure booster 31 via the regulator 33, the pedal tread force is amplified. The master cylinder 32 generates a master cylinder pressure with a predetermined multiplication ratio with respect to the pedal tread force.

The reservoir 34 for reserving the brake fluid is arranged above the master cylinder 32 and the regulator 33. The master cylinder 32 communicates with the reservoir 34 when the stepping-on of the brake pedal 24 is released. On the other hand, the regulator 33 communicates with both the reservoir 34 and an accumulator 35 of the power fluid pressure source 30 to make the reservoir 34 to be a low-pressure source and the accumulator 35 to be a high-pressure source, thereby allowing a fluid pressure almost the same as the master cylinder pressure to be generated. Hereinafter, the fluid pressure in the regulator 33 is appropriately referred to as a "regulator pressure". It is not needed to make the master cylinder pressure and the regulator pressure to be accurately the same as each other, and it is also possible to design the master cylinder unit 27 such that, for example, the regulator pressure is slightly higher than the master cylinder pressure.

The power fluid pressure source 30 includes the accumulator 35 and a pump 36. The accumulator 35 converts the pressure energy of the brake fluid whose pressure has been increased by the pump 36 into the pressure energy of a filler gas, such as nitrogen, for example, into approximately 14 to 22 MPa, and accumulates the energy. The pump 36 has a motor 36a as a driving source, and the suction port of the pump is connected to the reservoir 34, while the discharge port thereof is connected to the accumulator 35. The accumulator 35 is also connected to a relief valve 35a provided in the master cylinder unit 27. If the pressure of the brake fluid in the accumulator 35 is abnormally increased to, for example, approximately 25 MPa, the relief valve 35a is opened to return the high-pressure brake fluid into the reservoir 34.

As stated above, the fluid pressure brake unit 20 has the master cylinder 32, the regulator 33, and the accumulator 35, as a supply source of the brake fluid to the wheel cylinder 23. A master pipe 37, a regulator pipe 38, and an accumulator pipe 39 are connected to the master cylinder 32, the regulator 33, and the accumulator 35, respectively. Each of the master pipe 37, the regulator pipe 38, and the accumulator pipe 39 is connected to the fluid pressure actuator 40.

The fluid pressure actuator 40 includes both an actuator block in which a plurality of channels are formed and a plurality of electromagnetic control valves. The channels formed in the actuator block include individual channels 41, 42, 43, and 44 and a main channel 45. The individual channels 41 to 44 are respectively branched from the main channel 45 to be respectively connected to the wheel cylinders 23FR, 23FL, 23RR, and 23RL of the corresponding disc brake units 21FR, 21FL, 21RR, and 21RL. Thereby, each wheel cylinder 23 can communicate with the main channel 45.

ABS holding valves 51, 52, 53, and 54 are provided in the middle of the individual channels 41, 42, 43, and 44, respectively. Each of the ABS holding valves 51 to 54 has a solenoid on which an ON/OFF-control is performed and a spring, and is a normally-open electromagnetic control valve that is opened when the solenoid is not powered. Each of the ABS holding valves 51 to 54, in an open state, can distribute the brake fluid bidirectionally. That is, it becomes possible to make the brake fluid flow from the main channel 45 to the wheel cylinder 23, and vice versa, from the wheel cylinder 23 to the main channel 45. When the solenoid is powered and each of the ABS holding valves 51 to 54 is closed, the distribution of the brake fluid is blocked in the individual channels 41 to 44.

The wheel cylinder 23 is further connected to a reservoir channel 55 via pressure-reducing channels 46, 47, 48, and 49 respectively connected to the individual channels 41 to 44. Each of ABS pressure-reducing valves 56, 57, 58, and 59 is provided in the middle of each of the pressure-reducing channels 46, 47, 48, and 49. Each of the ABS pressure-reducing valves 56 to 59 has a solenoid on which an ON/OFF-control is performed and a spring, and is a normally-closed electromagnetic control valve that is closed when the solenoid is not powered. When each of the ABS pressure-reducing valves 56 to 59 is closed, the distribution of the brake fluid is blocked in the pressure-reducing channels 46 to 49. When the solenoid is powered to open each of the ABS pressure-reducing valves 56 to 59, the distribution of the brake fluid is permitted in the pressure-reducing channels 46 to 49, so that the brake fluid is refluxed into the reservoir 34 from the wheel cylinder 23 via the pressure-reducing channels 46 to 49 and the reservoir channel 55. The reservoir channel 55 is connected to the reservoir 34 in the master cylinder unit 27 via the reservoir pipe 77.

The main channel 45 has an isolation valve 60 in the middle thereof. The main channel 45 is divided, by this isolation valve 60, into a first channel 45a to be connected to the individual channels 41 and 42 and a second channel 45b to be connected to the individual channels 43 and 44. The first channel 45a is connected to the wheel cylinders 23FR and 23FL for front wheels via the individual channels 41 and 42, while the second channel 45b is connected to the wheel cylinders 23RR and 23RL for rear wheels via the individual channels 43 and 44.

The isolation valve 60 has a solenoid on which an ON/OFF-control is performed and a spring, and is a normally-closed electromagnetic control valve that is closed when the solenoid is not powered. When the isolation valve 60 is in a closed state, the distribution of the brake fluid is blocked in the main channel 45. When the solenoid is powered to open the isolation valve 60, the brake fluid can be distributed bidirectionally between the first channel 45a and the second channel 45b.

A master channel 61 and a regulator channel 62 both communicating with the main channel 45 are formed in the fluid pressure actuator 40. In more detail, the master channel 61 is connected to the first channel 45a of the main channel 45 and the regulator channel 62 is connected to the second channel 45b thereof. The master channel 61 is connected to the master pipe 37 communicating with the master cylinder 32. The regulator channel 62 is connected to the regulator pipe 38 communicating with the regulator 33.

The master channel 61 has a master cut valve 64 in the middle thereof. The master cut valve 64 is provided in a supply channel of the brake fluid from the master cylinder 32 to each wheel cylinder 23. The master cut valve 64 has a solenoid on which an ON/OFF-control is performed and a spring, and is a normally-open electromagnetic control valve that is opened when the solenoid is not powered, a closed state of the master cut valve 64 being ensured by the electromagnetic force generated by the solenoid when receiving a supply of a specified control current. When opened, the master cut valve 64 can distribute the brake fluid bidirectionally between the master cylinder 32 and the first channel 45a of the main channel 45. When the master cut valve 64 is closed by the solenoid being powered with the specified control current, the distribution of the brake fluid is blocked in the master channel 61.

A stroke simulator 69 is connected, on the upstream side from the master cut valve 64, to the master channel 61 via a simulator cut valve 68. That is, the simulator cut valve 68 is provided in the channel connecting the master cylinder 32 and the stroke simulator 69. The simulator cut valve 68 has a solenoid on which an ON/OFF-control is performed and a spring, and is a normally-closed electromagnetic control valve that is closed when the solenoid is not powered, an open state of the simulator cut valve 68 being ensured by the electromagnetic force generated by the solenoid when receiving a supply of a specified control current. When the simulator cut valve 68 is in a closed state, the distribution of the brake fluid is blocked between the master channel 61 and the stroke simulator 69. When the simulator cut valve 68 is opened by the solenoid being powered, the brake fluid can be distributed bidirectionally between the master cylinder 32 and the stroke simulator 69.

The stroke simulator 69 includes a plurality of pistons and springs to create a reactive force in accordance with the tread force on the brake pedal 24 by a driver when the simulator cut valve 68 is released. In order to improve a feeling in a bake operation by a driver, it is preferable to adopt, as the stroke simulator 69, a stroke simulator having multi-stage spring properties.

The regulator channel 62 has a regulator cut valve 65 in the middle thereof. The regulator cut valve 65 is provided in a supply channel of the brake fluid from the regulator 33 to each wheel cylinder 23. The regulator cut valve 65 also has a solenoid on which an ON/OFF control is performed and a spring, and is a normally-open electromagnetic control valve that is opened when the solenoid is not powered, a closed state of the regulator cut valve 64 being ensured by the electromagnetic force generated by the solenoid when receiving a supply of a specified control current. When opened, the regulator cut valve 65 can distribute the brake fluid bidirectionally between the regulator 33 and the second channel 45b of the main channel 45. When the regulator cut valve 65 is closed by the solenoid being powered, the distribution of the brake fluid is blocked in the regulator channel 62.

An accumulator channel 63 is also formed in the fluid pressure actuator 40, in addition to the master channel 61 and the regulator channel 62. One end of the accumulator channel 63 is connected to the second channel 45b of the main channel 45, while the other end thereof is connected to the accumulator pipe 39 communicating with the accumulator 35.

The accumulator channel 63 has a pressure-increasing linear control valve 66 in the middle thereof. The accumulator channel 63 and the second channel 45b of the main channel 45 are connected to the reservoir channel 55 via a pressure-reducing linear control valve 67. Each of the pressure-increasing linear control valve 66 and the pressure-reducing linear control valve 67 has a linear solenoid and a spring, and is a normally-closed electromagnetic control valve that is closed when the solenoid is not powered. The valve opening angle of each of the pressure-increasing linear control valve 66 and the pressure-reducing linear control valve 67 is adjusted to be proportionate to a current supplied to each solenoid.

The pressure-increasing linear control valve 66 is provided as a common pressure-increasing control valve among each of the multiple wheel cylinders 23 provided so as to correspond to each of the wheels. Similarly, the pressure-reducing linear control valve 67 is also provided as a common pressure-reducing control valve among each of the multiple wheel cylinders 23. That is, in the present embodiment, the pressure-increasing linear control valve 66 and the pressure-reducing linear control valve 67 are provided as a pair of common control valves for controlling the supply/ discharge of the operating fluid that is sent out from the power fluid pressure source 30 to/from each of the wheel cylinders 23. It is preferable in terms of cost that the pressure-increasing linear control valve 66 and the pressure-reducing linear control valve 67 are provided so as to be common among each of the wheel cylinders 23, as stated above, in comparison with the case where a linear control valve is provided for every wheel cylinder 23.

Herein, the differential pressure between the inlet port and the outlet port of the pressure-increasing linear control valve 66 corresponds to the differential pressure between the pressure of the brake fluid in the accumulator 35 and that in the main channel 45, while the differential pressure between the inlet port and the outlet port of the pressure-reducing linear control valve 67 corresponds to the differential pressure between the pressure of the brake fluid in the main channel 45 and that in the reservoir 34. When it is assumed that: an electromagnetic drive force, corresponding to the supply power to the linear solenoid of each of the pressure-increasing linear control valve 66 and the pressure-reducing linear control valve 67, is F1; the biasing force of the spring is F2; and a differential pressure acting force, corresponding to the differential pressure between the inlet port and the outlet port of each of the pressure-increasing linear control valve 66 and the pressure-reducing linear control valve 67, is F3, the relationship of F1+F3=F2 is satisfied. Accordingly, by continuously controlling the supply power to the linear solenoid of each of the pressure-increasing linear control valve 66 and the pressure-reducing linear control valve 67, the differential pressure between the inlet port and the outlet port of each of the pressure-increasing linear control valve 66 and the pressure-reducing linear control valve 67 can be controlled.

In the fluid pressure brake unit 20, the power fluid pressure source 30 and the fluid pressure actuator 40 are controlled by the brake ECU 70. The brake ECU 70 is formed as a microprocessor including a CPU, and includes a ROM for storing various programs, a RAM for temporarily storing data, an input/output port, and a communication port, etc., in addition to the CPU. The brake ECU 70 can communicate with the higher-level hybrid ECU 7, etc., to control the pump 36 of the power fluid pressure source 30 and the electromagnetic control valves 51 to 54, 56 to 59, 60, and 64 68, all of which forms the fluid pressure actuator 40, based on a control signal from the hybrid ECU and signals from various sensors.

A regulator pressure sensor 71, an accumulator pressure sensor 72, and a control pressure sensor 73 are connected to the brake ECU 70. The regulator pressure sensor 71 detects, on the upstream side from the regulator cut valve 65, the pressure of the brake fluid in the regulator channel 62, i.e., the regulator pressure, and provides a signal indicating the detected pressure to the brake ECU 70. The accumulator pressure sensor 72 detects, on the upstream side from the pressure-increasing linear control valve 66, the pressure of the brake fluid in the accumulator channel 63, i.e., the accumulator pressure, and provides a signal indicating the detected pressure to the brake ECU 70. The control pressure sensor 73 detects the pressure of the brake fluid in the first channel 45a of the main channel 45, and provides a signal indicating the detected pressure to the brake ECU 70. The pressure detected by each of the pressure sensors 71 to 73 is sequentially provided to the brake ECU 70 at predetermined intervals to be stored and held in a predetermined storage area of the brake ECU 70.

When the first channel 45a and the second channel 45b of the main channel 45 communicate with each other by the isolation valve 60 being opened, the output value of the control pressure sensor 73 indicates the fluid pressure on the lower pressure side of the pressure-increasing linear control valve 66 and also indicates the fluid pressure on the higher pressure side of the pressure-reducing linear control valve 67. Accordingly, the output value can be used for the control of the pressure-increasing linear control valve 66 and the pressure-reducing linear control valve 67. When the pressure-increasing linear control valve 66 and the pressure-reducing linear control valve 67 are closed and when the master cut valve 64 is opened, the output value of the control pressure sensor 73 indicates the master cylinder pressure. Further, when the first channel 45a and the second channel 45b of the main channel 45 communicate with each other by the isolation valve 60 being opened such that each of the ABS holding valves 51 to 54 is opened, and when each of the ABS pressure-reducing valves 56 to 59 is closed, the output value of the control pressure sensor 73 indicates an operating fluid pressure that acts on each of the wheel cylinders 23, i.e., a wheel cylinder pressure.

Further, a stroke sensor 25 provided in the brake pedal 24 is also included in the sensors connected to the brake ECU 70. The stroke sensor 25 detects a pedal stroke as an operation amount of the brake pedal 24, and provides a signal indicating the detected stroke to the brake ECU 70. The output value of the stroke sensor 25 is also sequentially provided to the brake ECU 70 at predetermined intervals to be stored and held in a predetermined storage area of the brake ECU. Alternatively, a means for detecting an operating state of the brake, other than the stoke sensor 25, may be provided and connected to the brake ECU 70, in addition to the stroke sensor 25 or instead thereof. Examples of the means for detecting an operating state of the brake include, for example, a pedal tread force sensor for detecting an operating force of the brake pedal 24, and a brake switch for detecting the fact that the brake pedal 24 has been stepped on, etc.

Figure 3:
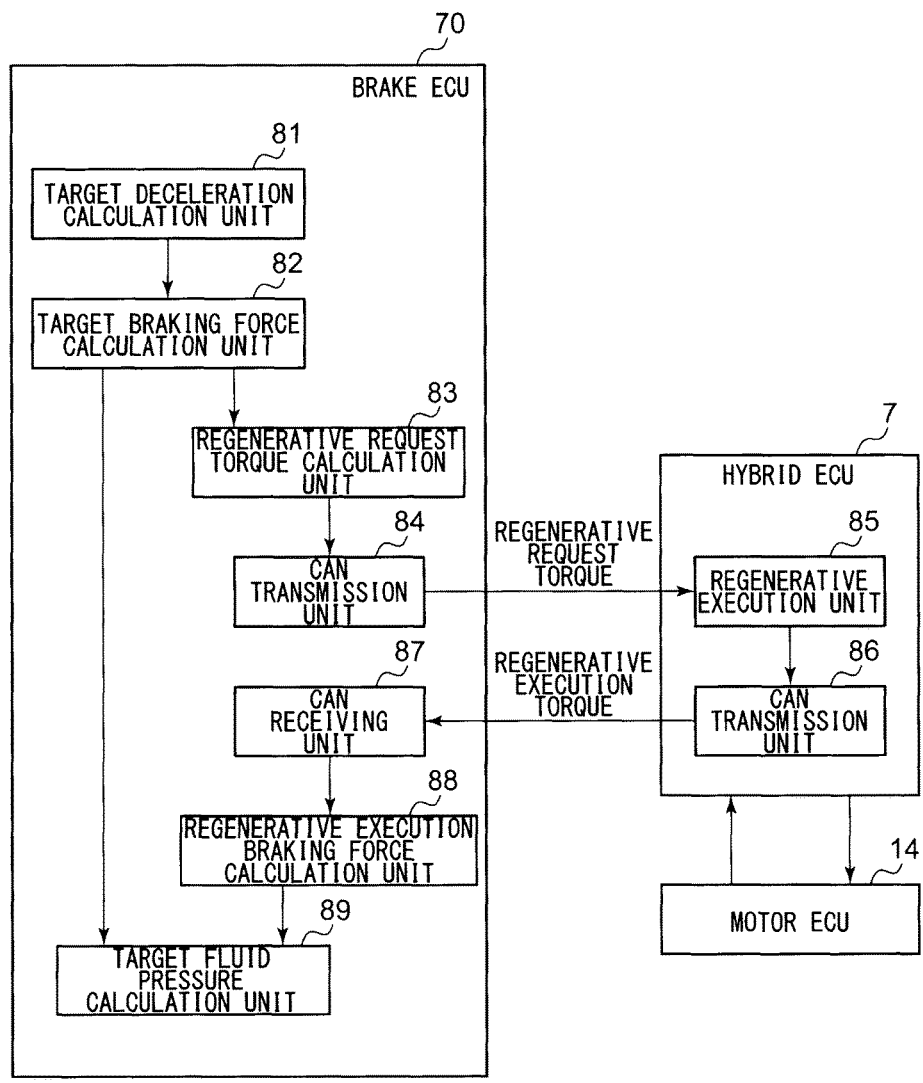
FIG. 3 is a view schematically illustrating the process for calculating each braking force in a control unit.

Subsequently, a process for calculating the fluid pressure braking force and the regenerative braking force in the regenerative cooperative control according to the embodiment will be described. FIG. 3 is a view schematically illustrating the process for calculating each braking force in the control unit.

The brake ECU 70 initiates the calculation of each braking force when receiving a braking request. The braking request is created when a braking force should be provided to a vehicle, for example, when a driver operates the brake pedal 24, etc. The brake ECU 70 calculates a target braking force when receiving the braking request, and calculates a target fluid pressure braking force, which is a fluid pressure braking force that should be generated by the fluid pressure brake unit 20, by subtracting a regenerative braking force from the target braking force.

Specifically, the brake ECU 70 includes: a target deceleration calculation unit 81; a target braking force calculation unit 82; a regenerative request torque calculation unit 83; a CAN transmission unit 84; a CAN receiving unit 87; a regenerative execution braking force calculation unit 88; and a target fluid pressure calculation unit 89. The hybrid ECU 7 includes a regenerative execution unit 85 and a CAN transmission unit 86.

The target deceleration calculation unit 81 detects a stroke amount of the brake pedal 24 based on an output of the stroke sensor 25 when receiving a braking request, and calculates a target deceleration. Alternatively, the target deceleration calculation unit 81 may calculate the target deceleration based on a braking request issued by a driving support control of a vehicle. Subsequently, the target braking force calculation unit 82 calculates a target braking force to be provided to each of the wheels based on the calculated deceleration.

On the other hand, the regenerative request torque calculation unit 83 calculates a regenerative request torque (which corresponds to a "regenerative target value") from the target braking force. The CAN transmission unit 84 transmits the information on the regenerative request torque to the hybrid ECU 7 through a CAN (controller area network). Alternatively, the regenerative request torque calculation unit 83 may receive a regenerable maximum value from the hybrid ECU 7 to calculate the regenerative request torque based on the regenerable maximum value. For example, the regenerative request torque calculation unit 83 limits the regenerative request torque not to exceed the regenerable maximum value, and supplies the limited regenerative request torque to the hybrid ECU 7. The regenerable maximum value means an upper limit value under which the regenerative brake unit 10 can use and the regenerative braking cannot be executed exceeding the limit value. The limit value includes both an upper limit value on the power generation side, which is an upper limit value of the regenerative braking force defined by the number of rotations of the electric motor 6, etc., and an upper limit value on the power accumulation side, which is an upper limit value defined based on the charging capacity of the battery 12, etc. The regenerative request torque calculation unit 83 also adds a predetermined inflation value, which will be described later, to the regenerative request torque.

The regenerative execution unit 85 in the hybrid ECU 7 outputs the required regenerative braking force to the motor ECU 14. The motor ECU 14 outputs a control command to the power converter 11 such that the braking torque provided, by the electric motor 6, to each of the right and left front wheels 9FR and 9FL is equal to the regenerative request torque. The power converter 11 controls the electric motor 6 based on the command from the motor ECU 14. Thereby, the kinetic energy of the vehicle 1 is converted into an electric energy to be accumulated in the battery 12 from the electric motor 12 via the power converter 11. The accumulated energy is used for the subsequent drive of wheels, etc., thereby contributing to the improvement in the fuel consumption of a vehicle.

When acquiring the information indicating an actual operating state of the regenerative brake unit 10, such as the number of rotations of the electric motor 6, etc., the motor ECU 14 transmits the information to the hybrid ECU 7. The regenerative execution unit 85 calculates the regenerative execution torque (which corresponds to a "regenerative execution value") actually provided to the wheels based on the actual operating state of the regenerative brake unit 10, and the CAN transmission unit 86 transmits the information on the regenerative execution torque to the brake ECU 70.

The CAN receiving unit 87 receives the information on the regenerative execution torque. The regenerative execution braking force calculation unit 88 calculates a regenerative execution braking force based on the received information on the regenerative execution torque, and the target fluid pressure calculation unit 89 calculates a target fluid pressure braking force (which corresponds to a "friction target value"), which is a fluid pressure braking force that should be generated by the fluid pressure brake unit 20, by subtracting the calculated regenerative execution braking force from the target braking force. The target fluid pressure calculation unit 89 then calculates the target fluid pressure for each of the wheel cylinders 23FR to 23RL based on the calculated target fluid pressure braking force. The brake ECU 70 defines, by a feedback control, a value of the control current supplied to the pressure-increasing linear control valve 66 and the pressure-reducing linear control valve 67, so that the wheel cylinder pressure is equal to the target fluid pressure. The calculation cycle of the regenerative execution braking force calculation unit 88 or the target fluid pressure calculation unit 89 may be smaller than that of the target deceleration calculation unit 81, the target braking force calculation unit 82, or the regenerative request torque calculation unit 83.

As a result, in the fluid pressure brake unit 20, the brake fluid is supplied to each wheel cylinder 23 from the power fluid pressure source 30 via the pressure-increasing linear control valve 66, thereby allowing a braking force to be provided to a wheel. In addition, the brake fluid is discharged from each wheel cylinder 23 via the pressure-reducing linear control valve 67, if needed, and accordingly the braking force to be provided to a wheel can be adjusted. In the embodiment, a wheel cylinder pressure control system is formed by including the power fluid pressure source 30, the pressure-increasing linear control valve 66, and the pressure-reducing linear control valve 67, etc. A so-called brake-by-wire braking force control is executed by the wheel cylinder pressure control system. The wheel cylinder pressure control system is provided in parallel with the supply channel of the brake fluid from the master cylinder unit 27 to the wheel cylinder 23. In this case, the brake ECU 70 closes the regulator cut valve 65 and the master cut valve 64 such that the brake fluid sent out from the regulator 33 and the master cylinder 32 is not supplied to the wheel cylinder 23. As stated above, the brake ECU 70 controls the fluid pressure brake unit 20 such that the brake fluid pressure is equal to the target fluid pressure. Thereby, a fluid pressure braking force is provided to each wheel.

In regenerative braking, the brake ECU 70 transmits regenerative request torque to the hybrid ECU 7 via a CAN, and the hybrid ECU 7 then executes the regenerative braking based on the regenerative request torque. The hybrid ECU 7 transmits regenerative execution torque via the CAN, the regenerative execution torque being a result of executing the regenerative braking based on the regenerative request torque. The brake ECU 70 calculates a regenerative execution braking force from the regenerative execution torque, and the target fluid pressure calculation unit 89 in the brake ECU 70 calculates a target fluid pressure braking force by subtracting the regenerative execution braking force from the target braking force. Herein, the brake ECU 70 and the hybrid ECU 7 receive and transmit information from/to each other via the CAN, and hence there is the possibility that a divergence may be caused between the regenerative request torque and the regenerative execution torque due to a lag in the control cycle or a delay in the communication. There is the possibility that: if the regenerative execution torque is supplied to the target fluid pressure calculation unit 89 at a delayed time even when the regenerative request torque is on the increase, fluid pressure braking may be calculated based on the regenerative execution torque immediately before the regenerative execution torque and the braking force corresponding to the response delay may be distributed to the fluid pressure braking, and hence the braking force may be converted into a friction energy without being regenerated. Specific description will be made with reference to FIG. 4.

FIGS. 4(*a*) and 4(*b*) are graphs illustrating a divergence between conventional regenerative request torque and regenerative execution torque. FIG. 4(*a*) illustrates the regenerative request torque and the regenerative execution torque, while FIG. 4(b) illustrates a regenerative braking force in which the regenerative execution torque is short with respect to the regenerative request torque. In FIGS. 4(a) and 4(b), the vertical axis represents braking force and the horizontal axis represents time. The solid line 92 represents the regenerative request torque and the dashed-dotted line 93 represents the regenerative execution torque.

Herein, as illustrated in FIG. 4(a), a request for regeneration is initiated at time t1, the request for regeneration is on the increase until time t3, and a constant request for regeneration is made after time t3. For example, the regenerative braking force after time t3 is equivalent to 2 m/s$^2$ in terms of deceleration.

When a regenerative request torque is sent out from the brake ECU 70 at time t1, the regenerative request torque is supplied to the brake ECU 70 at time t2, which is delayed from time t1. It has been found that, in a brake control system, the response delay, i.e., the difference between time t1 and time t2, is approximately up to 50 ms. Because the delay of the regenerative execution is caused due to communication, the change in the regenerative request torque is the same as that in the regenerative execution torque.

The solid line 94 illustrated in FIG. 4(b) represents the difference between the regenerative request torque represented by the solid line 92 and the regenerative execution torque represented by the dashed-dotted line 93. That is, the solid line 94 represents a shortage in the regenerative braking force caused by the divergence between the regenerative request torque and the regenerative execution torque. The regenerative braking force corresponding to the shortage is converted into a friction energy without being regenerated, and becomes a loss in fuel consumption.

On the other hand, if the CAN is to be changed to reduce the response delay, it is needed that all the systems connected to the CAN are modified, which becomes very expensive.

Accordingly, the brake ECU 70 according to the embodiment controls the regenerative brake unit based on a second regenerative request torque larger than a first regenerative request torque calculated based on the target braking force. That is, larger regenerative request torque is transmitted to the hybrid ECU 7 by inflating the regenerative request torque calculated based on the target braking force. Thereby, a shortage in the regeneration, caused due to a response delay, can be compensated, and hence regenerative braking can be used efficiently.

Figure 5A:
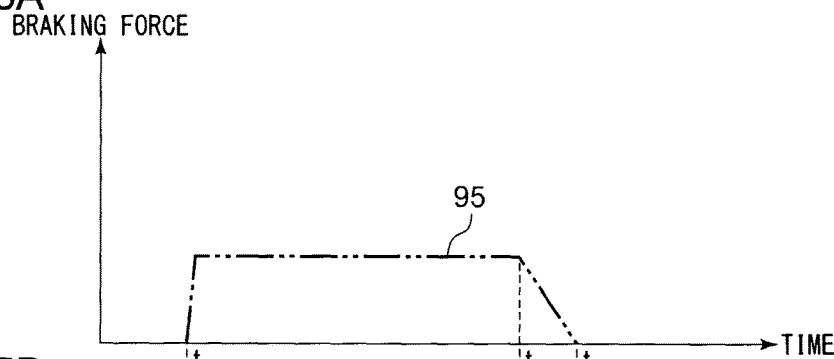
FIGS. 5(a) to 5(c) are graphs illustrating inflation of the regenerative request torque according to the embodiment.
Figure 5B:
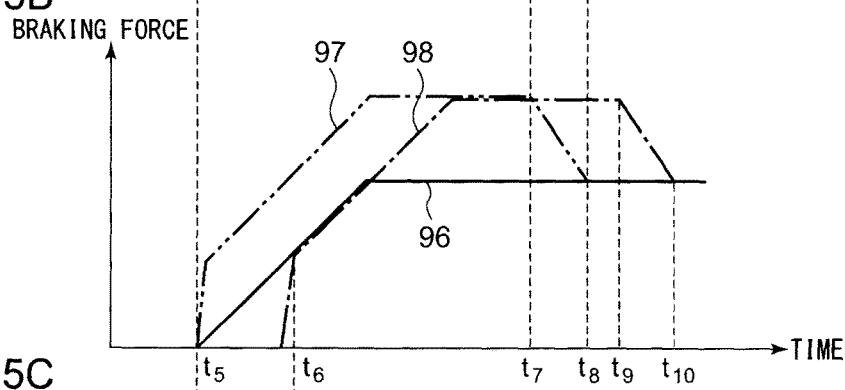
Figure 5C:
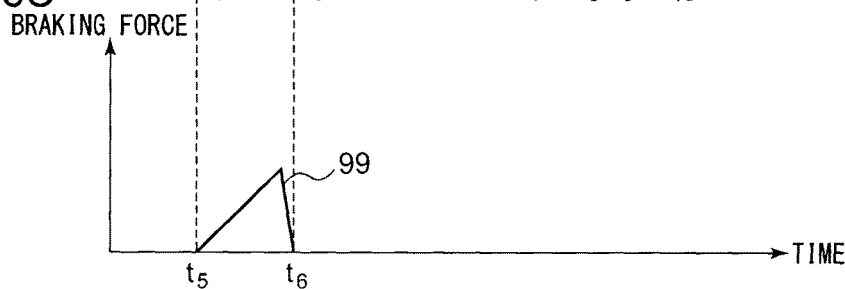

FIGS. 5(a) to 5(c) are graphs illustrating inflation of the regenerative request torque according to the embodiment. FIG. 5(a) illustrates an inflation value; FIG. 5(b) illustrates the first regenerative request torque, the second regenerative request torque, and the regenerative execution torque; and FIG. 5(c) illustrates the regenerative braking force in which the regenerative execution torque is short with respect to the second regenerative request torque. The vertical axis of in these graphs represents braking force and the horizontal axis represents time. The dashed-two dotted line 95 represents an inflation value to be added to the first regenerative request torque. The solid line 96 represents the first regenerative request torque, and the dashed-two dotted line 97 represents the second regenerative request torque obtained by adding the inflation value to the first regenerative request torque. The dashed-dotted line 98 represents the regenerative execution torque.

As illustrated by the first regenerative request torque represented by the solid line 96 in FIG. 5(b), a request for regeneration is on the increase after the request is initiated at time t5, and thereafter a constant request for regeneration is made. When the regeneration is initiated from time t5, an inflation value is added to the first regenerative request torque, and the inflation value is gradually reduced from time t7, which is made to be 0 at time t8. For example, the inflation value to be added to the first request torque between time t6 and time t7 is 0.25 m/s$^2$ in terms of deceleration. It is because a brake feeling of a driver is made good that the inflation value is gradually reduced from time t7. The inflation value is controlled by time between time t5 when the first regenerative request torque is inflated and time t8. For example, the inflation value is set to 2 s between time t5 and time t7, and set to 0.2 s between time t7 and time t8. Addition of the inflation value is calculated by the regenerative request torque calculation unit 83.

The regenerative execution torque represented by the dashed-dotted line 98 is illustrated at a time delayed in accordance with the second regenerative request torque represented by the dashed-two dotted line 97. The regenerative execution torque exerts the same braking force as the first regenerative request torque at time t6. The regenerative execution torque represented by the dashed-dotted line 98 sharply rises at time t6 in comparison with the rise of the first regenerative request torque at time t5, thereby allowing a sticking feeling in the initial stage of braking to be provided to a driver. Although the regenerative execution torque becomes larger than the first regenerative request torque, there is no trouble in driving even when an excessive braking force equivalent to approximately 0.25 m/s$^2$ deceleration is temporarily added, and the recovered energy of the regenerative braking is increased.

The solid line 99 illustrated in FIG. 5(c) represents the difference obtained by subtracting the regenerative execution torque from the first regenerative request torque. That is, the solid line 99 represents a shortage in the regenerative braking force. The shortage in the regenerative braking force represented by the solid line 99 is greatly reduced in comparison with that in the regenerative braking force represented by the solid line 94 in FIG. 4(b). Accordingly, the regenerative braking force, corresponding to a portion reduced in comparison with the solid line 94 in FIG. 4(b), can be used, thereby allowing a fuel consumption to be improved.

Addition of the inflation value is executed in the driving situations, such as initial stepping-on of the brake pedal, stepping on the brake pedal again and increasingly, and resumption of the regeneration. That is, when the first regenerative request torque is on the increase, the brake ECU 70 calculates the second regenerative request torque by adding the inflation value to the first regenerative request torque to control the regenerative brake unit 10 based on the second regenerative request torque. Thereby, a sense of discomfort in a brake feeling can be reduced in comparison with the case where the first regenerative request torque is on the decrease.

Figure 6:
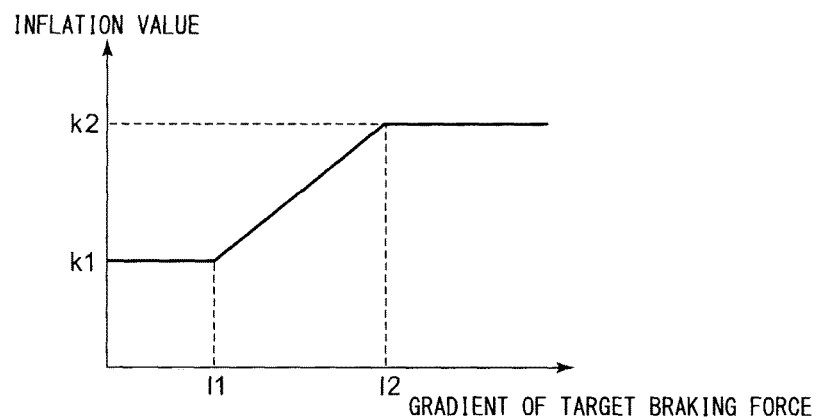
FIG. 6 is a graph illustrating the relationship between an inflation value and the gradient of a target braking force according to the embodiment.

FIG. 6 is a graph illustrating the relationship between an inflation value and the gradient of a target braking force according to the embodiment. The vertical axis in FIG. 6 represents the inflation value, while the horizontal axis represents the gradient of the target braking force. In FIG. 6, the inflation value and the target braking force are converted into deceleration.

As represented by the following equation (1), the inflation value according to the embodiment is calculated based on the gradient of a target braking force and a response delay between regenerative request torque and regenerative execution torque. The inflation value calculated by the equation (1) becomes a reference value of the reference value. Alternatively, the brake ECU 70 may hold the relationship of the equation (1) as a map and may derive an inflation value based on the map.

$$\text{Inflation value} = \text{Gradient of target braking force} \times \text{Response delay period of time} \quad (1)$$

Alternatively, the gradient of the target braking force may be the speed at which the brake pedal is stepped on, or may be the gradient of a target deceleration. Because the regenerative request torque calculation unit 83 receives the target braking force from the target braking force calculation unit 82, it is more advantageous in terms of calculating an inflation value to use the gradient of the target braking force than to use the gradient of the target deceleration. For example, the response delay period of time means the period between the time when the regenerative request torque is sent out from the regenerative request torque calculation unit 83 and the time when regenerative execution torque is received by the CAN receiving unit 87.

For example, the inflation value k1 is 0.1 m/s$^2$ and the inflation value k2 is 0.25 m/s$^2$ in terms of deceleration. The gradient 11 of the target braking force is 2 m/s$^3$ and the gradient 12 of the target braking force is 5 m/s$^3$ in terms of deceleration.

If an inflation value is set to be relatively large when a driver steps on the brake pedal at relatively low speed and when the gradient of the target braking force is small, there is the possibility that a driver may feel a sense of discomfort in a brake feeling. On the other hand, when a driver steps on the brake pedal at relatively high speed, a driver does not feel a sense of discomfort in a brake feeling even when an inflation value is set to be relatively large. Accordingly, the regenerative request torque calculation unit 83 sets an inflation value in accordance with the gradient of the target braking force, and calculates the inflation value so as to be larger as the gradient of the target braking force becomes larger. Thereby, the brake feeling for a driver is improved. Alternatively, when the gradient of the target braking force is smaller than 0, the regenerative request torque calculation unit 83 may calculate an inflation value so as to be smaller as the gradient of the target braking force becomes smaller, and may set the inflation value to 0.

In order to improve a brake feeling, the regenerative request torque calculation unit 83 further adjusts the inflation value in accordance with a correction coefficient based on vehicle speed.

Figure 7:
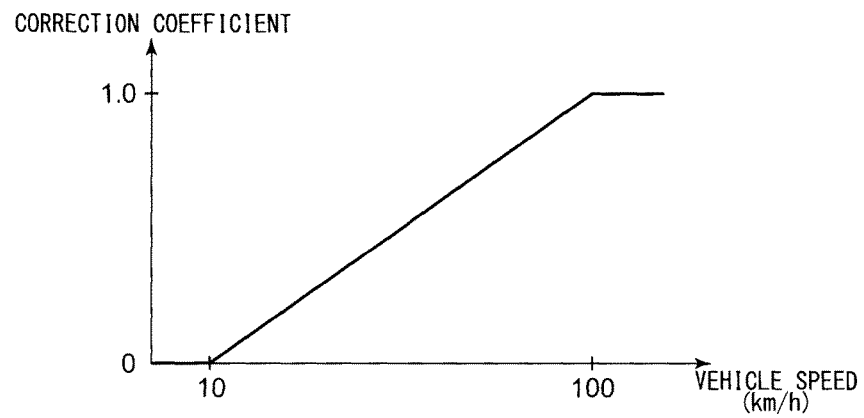
FIG. 7 is a graph illustrating the relationship between a correction coefficient for the inflation value and vehicle speed according to the embodiment.

FIG. 7 is a view illustrating the relationship between a correction coefficient for an inflation value and vehicle speed according to the embodiment. The vertical axis represents a correction coefficient for an inflation value, while the horizontal axis represents vehicle speed (km/h). The correction coefficient is a numeric a value within a range of 0 to 1. The correction coefficient is 0 when vehicle seed is within a range of 0 km/h to 10 km/h. As the vehicle speed becomes larger to be within a range of 10 km/h to 100 km/h, the inflation value becomes larger, which becomes 1 when the vehicle speed exceeds 100 km/h. The correction coefficient illustrated in FIG. 7 does not take gear change into consideration, and a correction coefficient for an inflation value may be set to be variable in accordance with the number of gear change.

The regenerative request torque calculation unit 83 corrects the inflation value calculated in the equation (1) by multiplying it by a correction coefficient based on vehicle speed illustrated in FIG. 7. Thereby, a brake feeling can be made good because a sense of discomfort in a brake feeling, occurring when vehicle speed is high, is smaller than that occurring when vehicle speed is low. Further, in regenerative braking, a larger energy can be recovered when vehicle speed is high than when vehicle speed is low, and hence an energy can be recovered efficiently. The regenerative energy is proportional to regenerative braking force and vehicle speed.

FIGS. 8(*a*) and 8(*b*) are graphs for explaining the process for reducing the inflation value according to the embodiment. FIG. 8(*a*) illustrates a target braking force and the second regenerative request torque, while FIG. 8(*b*) illustrates an inflation value. The vertical axis represents braking force, while the horizontal axis represents time. The solid line 102 represents the second regenerative request torque, while the dashed-dotted line 103 represents a target braking force. In FIG. 8(*a*), the second regenerative request torque represented by the solid line 102 and the target braking force represented by the dashed-dotted line 103 are both illustrated after being converted into deceleration. The solid line 104 represents an inflation value added to the second regenerative request torque represented by the solid line 102.

A request for regenerative braking is initiated at time t11, and an inflation value is added. When the second regenerative request torque reaches the regenerable maximum value at time t12, reduction of the inflation value is initiated, which becomes 0 at time t13.

Usually, the regenerative request torque calculation unit 83 gradually reduces an inflation value when a predetermined period of time has elapsed after the inflation of the first regenerative request torque was initiated, and finally makes the inflation value to be 0. By controlling the addition of an inflation value with time, it becomes possible to deal with a response delay. Further, by gradually reducing an inflation value, a brake feeling becomes good. The predetermined period of time may be set based on a response delay period of time.

On the other hand, when the second regenerative request torque has reached the regenerable maximum value, as illustrated between time t12 and time t13 in FIG. 8(*a*), the regenerative request torque calculation unit 83 reduces an inflation value based on the regenerable maximum value. That is, when the second regenerative request torque exceeds the regenerable maximum value if an inflation value is added to the first regenerative request torque, the regenerative request torque calculation unit 83 limits the inflation value such that the second regenerative request torque is equal to the regenerable maximum value. Thereby, the regenerative braking can be used as much as possible. When the reduction of an inflation value is once initiated, it is made that the inflation value is not increased again even if a brake operation is changed in the middle of the reduction.

While a drive support system, such as a stability control, anti-lock brake system, or the like, is being executed, an inflation value may be smaller than the reference value of the inflation value, or may be made to be 0.

The brake ECU 70 supplies regenerative request torque to the hybrid ECU 7 to control the regenerative brake unit 10 via the hybrid ECU 7. There is sometimes the case where regenerative braking is not executed by the regenerative brake unit 10 due to the upper limit of the number of rotations of the electric motor 6 or the charging capacity of the battery 12. Accordingly, it is unclear in the brake ECU 70 how much the regenerative brake unit 10 executes regenerative request torque even when the brake ECU 70 transmits the regenerative request torque to the hybrid ECU 7.

The brake ECU 70 calculates a target fluid pressure braking force based on the regenerative execution torque sent via the CAN. In this case, there is the possibility that a response delay may be caused between the time when the regenerative request torque calculation unit 83 calculates regenerative request torque and the time when the target fluid pressure calculation unit 89 calculates a target fluid pressure braking force. If the response delay is caused, there is sometimes the case where the regenerative braking and the friction braking cannot be distributed efficiently. In addition, if the regenerative execution torque indicating that regeneration is not executed at all even when regenerative request torque has been transmitted is sent, it is needed that a target fluid pressure braking force is added by the fiction brake unit to compensate the braking force that has not been provided in the regenerative braking; and hence an operating sound is sometimes caused by rapidly increasing the target fluid pressure braking force.

Accordingly, the brake ECU 70 according to the embodiment calculates a target fluid pressure braking force based on the regenerative request torque in which predetermined conditions are satisfied, and controls the friction brake unit based on the target fluid pressure braking force. It is advantageous to calculate a target fluid pressure braking force based on regenerative request torque before regenerative execution torque is sent from the hybrid ECU 7, in terms that, when the calculation cycle of the target fluid pressure calculation unit 89 is faster than those of the target braking force calculation unit 82 and the regenerative request torque calculation unit 83 and than the communication cycle of the CAN, the target fluid pressure calculation unit 89 can calculate the target fluid pressure braking force without waiting for the regenerative execution torque supplied via the CAN. Specific description will be made with reference to FIG. 9 or later.

FIG. 9 is a flowchart illustrating the procedure for calculating the target fluid pressure braking force according to the embodiment. This procedure is repeatedly executed. The regenerative execution braking force calculation unit 88 receives the regenerative request torque calculated by the regenerative request torque calculation unit 83. This regenerative request torque may be the inflated second regenerative request torque.

The CAN receiving unit 87 receives, from the hybrid ECU 7, the regenerable maximum value indicating the maximum value at which regenerative braking is possible (S12). The regenerative execution braking force calculation unit 88 determines whether the regenerative request torque calculated by the regenerative request torque calculation unit 83 is smaller than or equal to the regenerable maximum value (S14).

When the regenerative request torque is smaller than or equal to the regenerable maximum value (S14/Y), the regenerative execution braking force calculation unit 88 takes the regenerative request torque as regenerative execution torque (S16). When the regenerative request torque is larger than the regenerable maximum value (S14/N), the regenerative execution braking force calculation unit 88 receives regenerative execution torque from the hybrid ECU 7 (S18).

The regenerative execution braking force calculation unit 88 calculates regenerative execution braking force from the regenerative execution torque, while the target fluid pressure calculation unit 89 calculates target fluid pressure braking force based on both the target braking force calculated by the target braking force calculation unit 82 and the regenerative execution braking force (S20). Specific description will be made to the calculation by the target fluid pressure calculation unit 89. In a front-wheel-drive vehicle, regenerative execution braking force is subtracted from the target braking force of the front wheel calculated by target braking force calculation unit 82. When this calculation result is minus, the target fluid pressure braking force of a front wheel is made to be 0, and the target braking force of a rear wheel is calculated by subtracting the regenerative execution braking force, which corresponds to the aforementioned minus braking force, from the target braking force of the rear wheel, and the subtracted target braking force of the rear wheel is taken as the target fluid pressure braking force of the rear wheel. On the other hand, when the result of subtracting the regenerative execution braking force from the target braking force of the front wheel is plus, the target fluid pressure braking force of the front wheel is made to be the result of the subtraction, and the target braking force of the rear wheel is taken, as it is, as the target fluid pressure braking force of the rear wheel. Thus, a value obtained by subtracting regenerative execution braking force from a target braking force is taken as a target fluid pressure braking force. Subsequently, the fluid pressure in each wheel cylinder 23 is controlled so as to be equal to a target fluid pressure corresponding to the target fluid pressure braking force. Because regenerative braking cannot be used when a vehicle is stopped, the brake ECU 70 may switch the regenerative braking to friction braking before stopped. In addition, if the target fluid pressure is smaller than or equal to a predetermined pressure when regenerative braking is being used, the brake ECU 70 may control the fluid pressure in the wheel cylinder 23 so as to approach 0 as much as possible by fully opening the pressure-reducing linear control valve 67. The above predetermined pressure, close to 0, is one at which pressure reduction should be normally ended.

When the regenerative request torque is smaller than or equal to the regenerable maximum value, the brake ECU 70 can calculate the braking force to be provided to the friction brake unit based on the regenerative request torque required of the hybrid ECU 7. That is, the brake ECU 70 can calculate a target fluid pressure without the need of waiting until the reception of regenerative execution torque from the hybrid ECU 7 via the CAN. Regenerative braking and friction braking can be distributed efficiently by providing, without a response delay, a target braking force to a wheel by complementing the regenerative braking with the friction braking.

In the flowchart in FIG. 9, a method in which the brake ECU 70 receives the regenerable maximum value from the hybrid ECU 7 is illustrated. As a variation thereof, the brake ECU 70 may receive a regenerable flag from the hybrid ECU 7, instead of the regenerable maximum value. The regenerable flag may be one indicating that the regenerative braking more than or equal to a predetermined amount can be executed. In this case, when the regenerable flag indicates that regeneration can be executed, the brake ECU 70 calculates a target fluid pressure braking force by assuming that the regenerative request torque is the regenerative execution torque. When the regenerable flag indicates that regeneration cannot be executed, the brake ECU 70 receives regenerative execution torque from the hybrid ECU 7. A communication load on the CAN can be reduced by using the regenerable flag instead of the regenerable maximum value.

Figure 10:
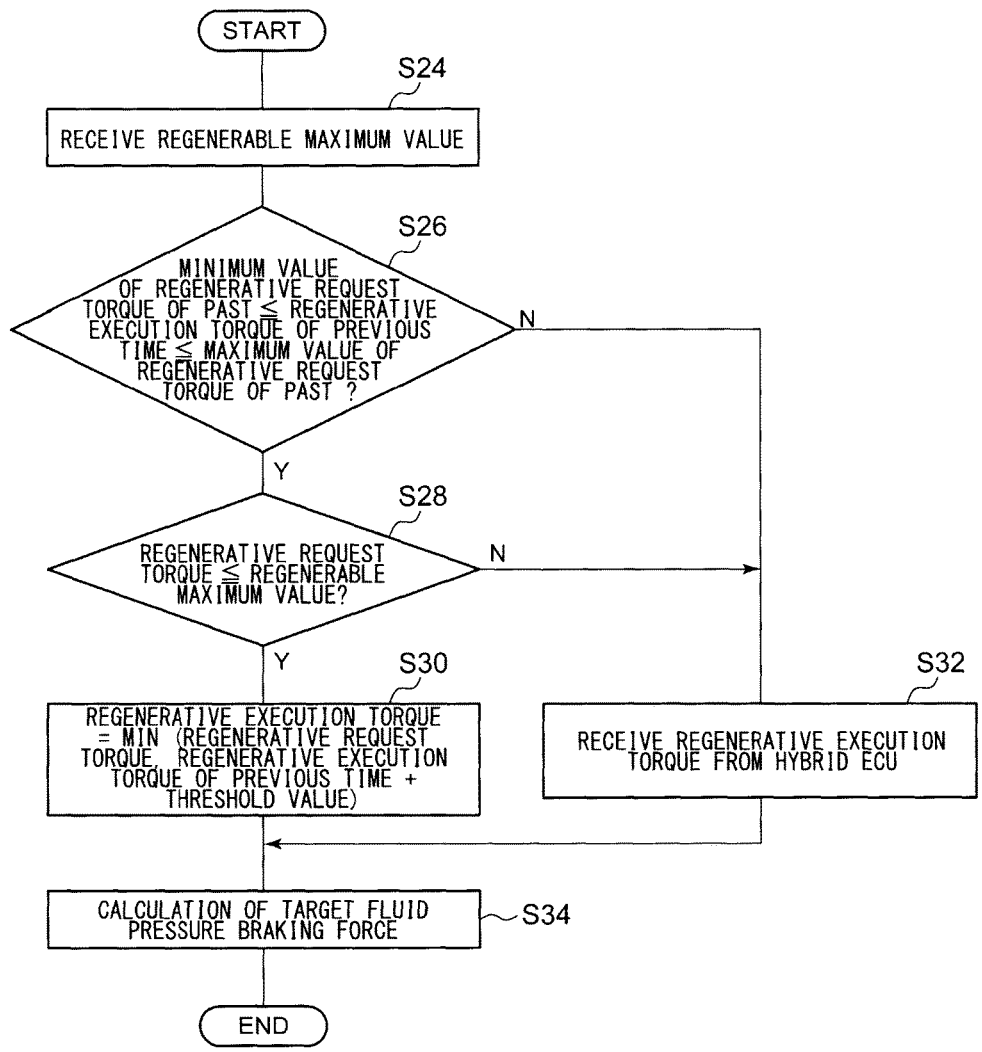
FIG. 10 is a flowchart illustrating a variation of the procedure for calculating the target fluid pressure braking force according to the embodiment.

FIG. 10 is a flowchart illustrating a variation of the procedure for calculating the target fluid pressure braking force according to the embodiment. This procedure is repeatedly executed. The regenerative execution braking force calculation unit 88 receives the regenerative request torque calculated by the regenerative request torque calculation unit 83. This regenerative request torque may be the inflated second regenerative request torque.

The CAN receiving unit 87 receives, from the hybrid ECU 7, the regenerable maximum value indicating the maximum value at which regenerative braking is possible (S24). The regenerative execution braking force calculation unit 88 determines whether the regenerative execution torque of the previous time is within a range of the maximum value to the minimum value of the regenerative request torque transmitted to the hybrid ECU 7 in the past within a predetermined period of time from this control time (S26). That is, the regenerative execution braking force calculation unit 88 determines whether the regenerative request torque of the previous time is diverged from the regenerative request torque transmitted in the past within a predetermined period of time. In other words, the brake ECU 70 determines whether the regenerative request torque supplied to the hybrid ECU 7 is fully executed, so that the regenerative execution torque in accordance with the regenerative request torque is supplied from the hybrid ECU 7. Thereby, it can be determined whether the regenerative request torque transmitted at the previous control cycle has been fully executed. When the regenerative request torque transmitted at the previous control cycle has been fully executed, the possibility that the regenerative request torque may be fully executed also at this control cycle is increased. Accordingly, with the use of this determination, presence/absence of regenerative execution can be managed by time, and hence execution reliability of regenerative request torque, occurring when the regenerative request torque is used as regenerative execution torque, can be enhanced. The predetermined period of time is set, for example, to the maximum value of a period of time for which the response of the regenerative execution torque can be delayed due to being transmitted via the CAN, and the period of time may be set to 50 ms. Herein, the "previous time" means the time at the control cycle one cycle before "this" control time.

When the regenerative execution torque of the previous time is not within a range of the maximum value to the minimum value of the regenerative request torque of the past (S26/N), the regenerative execution braking force calculation unit 88 receives regenerative execution torque from the hybrid ECU 7 via the CAN receiving unit 87, without assuming that the regenerative request torque is the regenerative execution torque (S32). It is because the possibility that the regenerative request torque may be executed as required is low also this time, since the regenerative request torque has not been executed as required at the previous control cycle.

When the regenerative request torque of the previous time is within a range of the maximum value to the minimum value of the regenerative request torque of the past within a predetermined period of time (S26/Y), that is, when it is determined that the regenerative execution torque of the previous time is the regenerative request torque supplied to the hybrid ECU 7 in the past within a predetermined period of time, the regenerative execution braking force calculation unit 88 determines whether the regenerative request torque calculated by the regenerative request torque calculation unit 83 is smaller than or equal to the regenerable maximum value (S28). When the regenerative request torque is larger than the regenerable maximum value (S28/N), the regenerative execution braking force calculation unit 88 receives regenerative execution torque from the hybrid ECU 7 (S32).

When the regenerative request torque is smaller than or equal to the regenerable maximum value (S28/Y), the regenerative execution braking force calculation unit 88 takes, as the regenerative execution torque, one of the regenerative request torque and a predetermined boundary value obtained by adding a predetermined threshold value to the regenerative execution torque of the previous time, the one being smaller than the other one (S30). That is, when the regenerative request torque of this time is larger than the regenerative execution torque of the previous time received from the hybrid ECU 7 by the predetermined threshold value, the regenerative execution braking force calculation unit 88 takes the torque obtained by adding the predetermined threshold value to the regenerative execution torque of the previous time as the regenerative execution torque. When the regenerative request torque of this time is smaller than or equal to the regenerative execution torque of the previous time by the predetermined threshold value, the regenerative execution braking force calculation unit 88 takes the regenerative request torque of this time as the regenerative execution torque of this time. Thereby, the risk that regeneration may not be fully executed even when regenerative request torque is transmitted can be reduced.

The predetermined threshold value is defined by experiment, etc., and may be changed in accordance with the gradient of the regenerative request torque. Alternatively, the predetermined threshold value may be increased or reduced in accordance with certain conditions. For example, when the regenerative request torque of this time is smaller than or equal to the regenerative execution torque of the previous time, the threshold value may be made to be 0. Examples of the case where the predetermined threshold value is reduced include the case where a braking request is on the decrease by returning the brake pedal, the case where there is the request from the hybrid ECU 7 that regenerative braking cannot be used, the case where a drive support system is being executed, and the case where the slip ratio of a vehicle is on the increase. On the other hand, examples of the case where the predetermined threshold value is increased include the case where an operation of regenerative braking is initiated and the case where provision of a vehicle braking force is initiated. When the regenerative execution torque of the previous time is not within a range of the maximum value to the minimum value of the regenerative request torque of the past within a predetermined period of time, the regenerative execution braking force calculation unit 88 may return the increased/reduced predetermined threshold value to the reference value.

The regenerative execution braking force calculation unit 88 calculates regenerative execution braking force from regenerative execution torque, and the target fluid pressure calculation unit 89 calculates target fluid pressure braking force based on both the target braking force calculated by the target braking force calculation unit 82 and regenerative execution braking force (S34). This calculation is the same as that illustrated in S20 in FIG. 9. The aforementioned steps, in which it is confirmed whether the transmitted regenerative request torque has been fully executed and thereby the reliability of the regenerative request torque is enhanced, may be appropriately combined. For example, in order to reduce a communication load on the CAN, the brake ECU 70 may calculate a target fluid pressure braking force by excluding the step of S28 so as not to use the regenerable maximum value.

Figure 11:
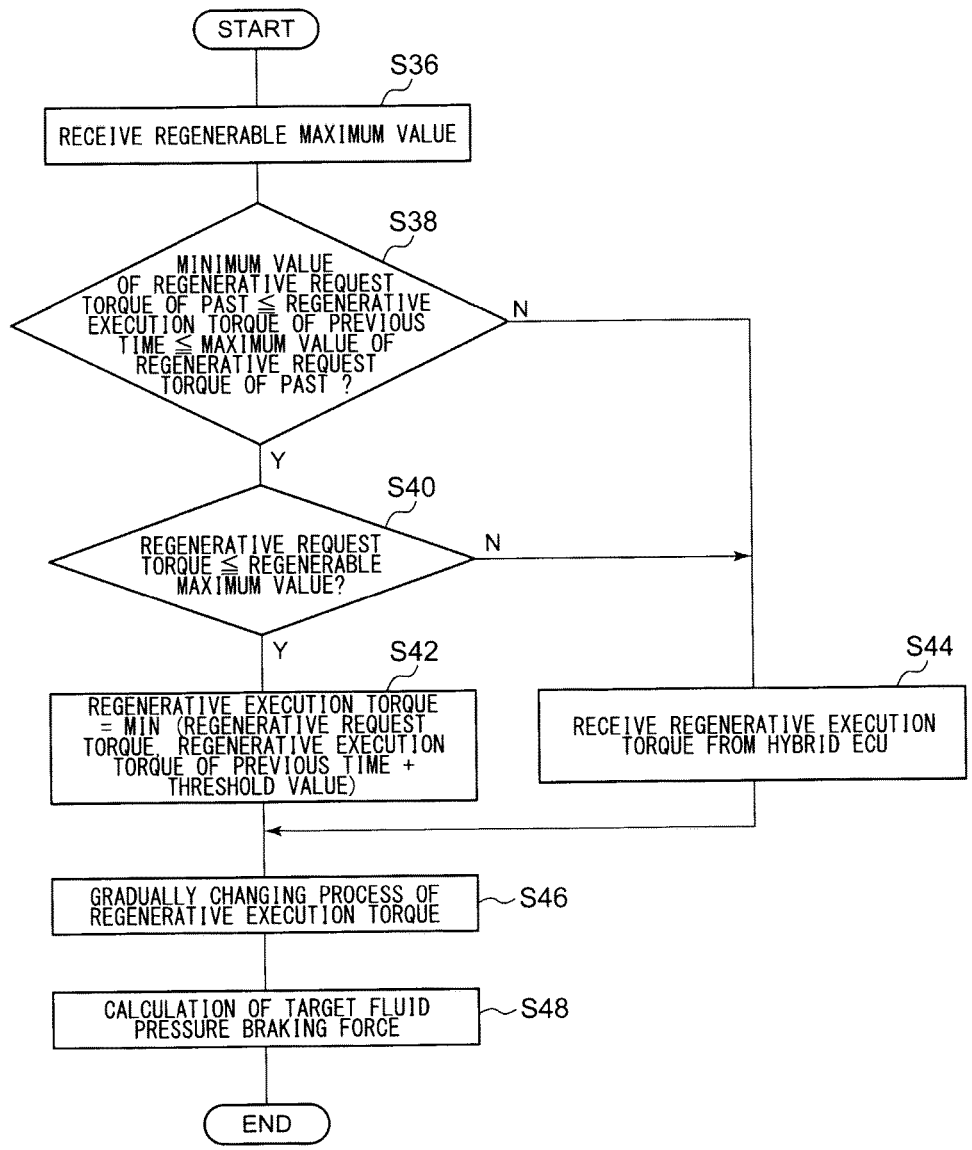
FIG. 11 is a flowchart illustrating a gradually changing process of the regenerative execution torque according to the embodiment.

FIG. 11 is a flowchart illustrating a gradually changing process of the regenerative execution torque according to the embodiment. In the procedure for calculating the target fluid pressure braking force according to the embodiment, there are two cases in one of which regenerative request torque is used as regenerative execution torque, and in the other of which the regenerative execution torque received from the hybrid ECU 7 is used as regenerative execution torque; and when the regenerative execution torque is switched to either of the two, a great difference is sometimes caused between before and after values of the regenerative execution torque. Accordingly, a gradually changing process for reducing the difference between before and after values thereof is executed so as not to cause a sense of discomfort in a brake feeling due to the difference.

The processes of S36 to S44 illustrated in FIG. 11 are the same as those illustrated in FIG. 10, and hence the description thereof will be omitted. The regenerative execution braking force calculation unit 88 executes a gradually changing process so as to reduce the difference between the regenerative execution torque of this time and that of the previous time (S46). The regenerative execution torque interpolated so as to reduce the difference between the regenerative execution torque of this time and that of the previous time is calculated. Specifically, the difference between the regenerative execution torque of this time and that of the previous time is divided in accordance with the number of gradual changes, and the divided difference is added to the regenerative execution torque of the previous time. The number of gradual changes is set based on the control cycle of each calculation unit.

The regenerative execution braking force calculation unit 88 calculates a regenerative execution braking force from regenerative execution torque, while the target fluid pressure calculation unit 89 calculates a target fluid pressure braking to force based on the target braking force calculated by the target braking force calculation unit 82 and the regenerative execution braking force (S48). Thereby, a brake feeling becomes good.

Figure 12:
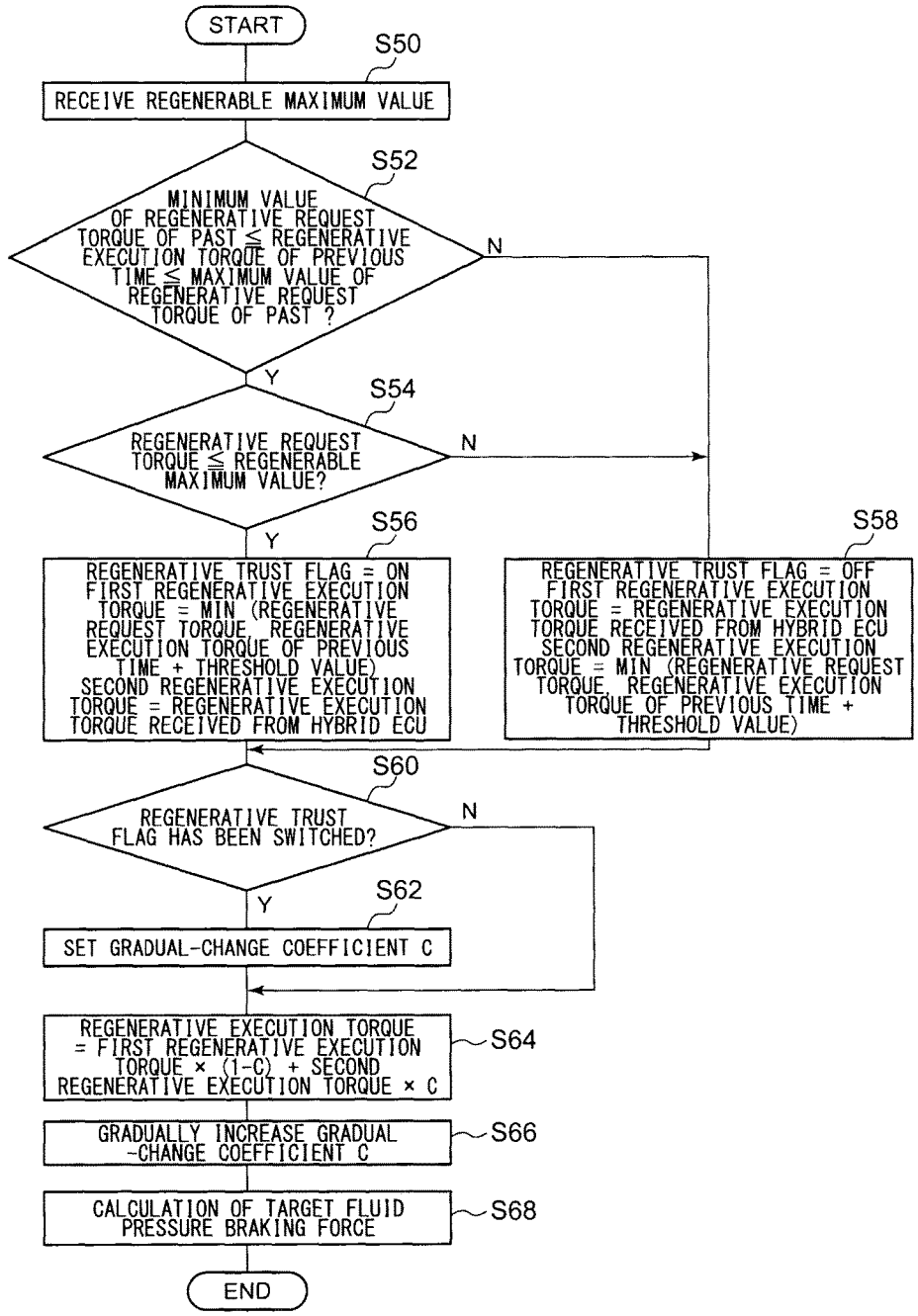
FIG. 12 is a flowchart illustrating a variation of the gradually changing process of the regenerative execution torque according to the embodiment.

FIG. 12 is a flowchart illustrating a variation of the gradually changing process of the regenerative execution torque according to the embodiment. The regenerative execution braking force calculation unit 88 receives the regenerative request torque calculated by the regenerative request torque calculation unit 83. This regenerative request torque may be the inflated second regenerative request torque.

The CAN receiving unit 87 receives, from the hybrid ECU 7, the regenerable maximum value indicating the maximum value at which regenerative braking is possible (S50). The regenerative execution braking force calculation unit 88 determines whether the regenerative execution torque of the previous time is within a range of the maximum value to the minimum value of the regenerative request torque transmitted to the hybrid ECU 7 in the past within a predetermined period of time from this control time (S52).

When the regenerative execution torque of the previous time is within a range of the maximum value to the minimum value of the regenerative request torque of the past within a predetermined period of time (S52/Y), the regenerative execution braking force calculation unit 88 determines whether the regenerative request torque calculated by the regenerative request torque calculation unit 83 is smaller than or equal to the regenerable maximum value (S54).

On the other hand, when the regenerative execution torque of the previous time is not within a range of the maximum value to the minimum value of the regenerative request torque of the past within a predetermined period of time (S52/N), the regenerative execution braking force calculation unit 88 turns off a regenerative trust flag, and takes the regenerative execution torque received from the hybrid ECU 7 as the first regenerative execution torque, and takes, as the second regenerative execution torque, one of the regenerative request torque and a predetermined boundary value obtained by adding a predetermined threshold value to the regenerative execution torque of the previous time, the one being smaller than the other one (S58). Also, when the regenerative request torque calculated by the regenerative request torque calculation unit 83 is larger than the regenerable maximum value (S54/N), the same process as described above are executed (S58).

When the regenerative request torque calculated by the regenerative request torque calculation unit 83 is smaller than or equal to the regenerable maximum value (S54/Y), the regenerative execution braking force calculation unit 88 turns on the regenerative trust flag, and takes, as the first regenerative execution torque, one of the regenerative request torque and a predetermined boundary value obtained by adding a predetermined threshold value to the regenerative execution torque of the previous time, the one being smaller than the other one, and takes the regenerative execution torque received from the hybrid ECU 7 as the second regenerative execution torque (S56). Alternatively, the initial setting of the regenerative trust flag may be OFF.

The regenerative execution braking force calculation unit 88 determines whether the regenerative trust flag has been switched (S60). That is, it is determined whether the regenerative trust flag has been switched from ON to OFF or from OFF to ON. When the regenerative trust flag has been switched (S60/Y), the regenerative execution braking force calculation unit 88 sets a gradual-change coefficient to 0, and newly initiates a gradually changing process (S62). The gradual-change coefficient is a numeric value between 0 and 1.

The regenerative execution braking force calculation unit 88 calculates regenerative execution torque by distributing the first regenerative execution torque and the second regenerative execution torque in accordance with the gradual-change coefficient (S64). Specifically, new regenerative execution torque is calculated by the following equation (2).

$$\text{Regenerative execution torque} = \text{First regenerative request torque} \times (1-C) + \text{Second regenerative execution torque} \times C \quad (2)$$

When the regenerative trust flag has not been switched (S60/N), the regenerative execution braking force calculation unit 88 calculates regenerative execution torque by distributing the first regenerative execution torque and the second regenerative execution torque in accordance with the gradual-change coefficient, without resetting the gradual-change coefficient (S64).

Subsequently, the regenerative execution braking force calculation unit 88 gradually increases the gradual-change coefficient $C$ so as to approach 1 (S66). For example, the gradual-change coefficient $C$ may be gradually increased in accordance with time. Alternatively, the gradual-change coefficient $C$ may be gradually increased after a predetermined gradual-change period of time has elapsed. The regenerative execution braking force calculation unit 88 calculates a regenerative execution braking force from the regenerative execution torque, while the target fluid pressure calculation unit 89 calculates a target fluid pressure braking force based on both the target braking force calculated by the target braking force calculation unit 82 and the regenerative execution braking force (S68). By executing the gradually changing process in this way, the difference between the regenerative execution torque of this time and that of the previous time can be reduced and a braking feeling can be made good.

Figure 13:
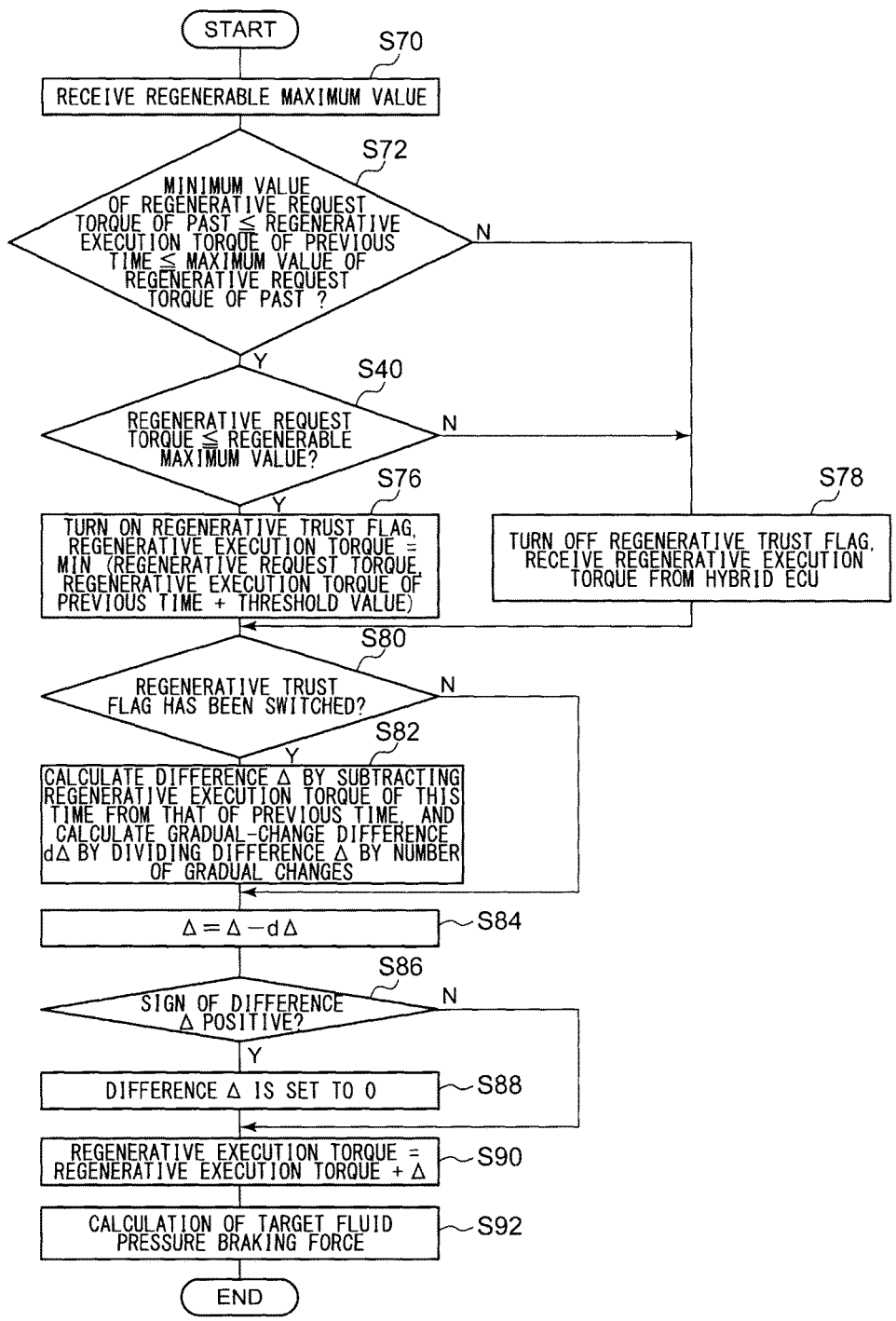
FIG. 13 is a flowchart illustrating a variation of the gradually changing process of the regenerative execution torque according to the embodiment.

FIG. 13 is a flowchart illustrating a variation of the gradually changing process of the regenerative execution torque according to the embodiment. The regenerative execution braking force calculation unit 88 receives the regenerative request torque calculated by the regenerative request torque calculation unit 83. This regenerative request torque may be the inflated second regenerative request torque.

The CAN receiving unit 87 receives, from the hybrid ECU 7, the regenerable maximum value indicating the maximum value at which regenerative braking is possible (S70). The regenerative execution braking force calculation unit 88 determines whether the regenerative execution torque of the previous time is within a range of the maximum value to the minimum value of the regenerative request torque transmitted to the hybrid ECU 7 in the past within a predetermined period of time from this control time (S72).

When the regenerative execution torque of the previous time is within a range of the maximum value to the minimum value of the regenerative request torque of the past within a predetermined period of time (S72/Y), the regenerative execution braking force calculation unit 88 determines whether the regenerative request torque calculated by the regenerative request torque calculation unit 83 is smaller than or equal to the regenerable maximum value (S74).

On the other hand, when the regenerative execution torque of the previous time is not within a range of the maximum value to the minimum value of the regenerative request torque of the past within a predetermined period of time (S72/N), the regenerative execution braking force calculation unit 88 turns off the regenerative trust flag, and receives regenerative execution torque from the hybrid ECU 7 (S78). Also, when the regenerative request torque calculated by the regenerative request torque calculation unit 83 is larger than the regenerable maximum value (S74/N), the regenerative execution braking force calculation unit 88 turns off the regenerative trust flag, and receives regenerative execution torque from the hybrid ECU 7 (S78).

When the regenerative request torque calculated by the regenerative request torque calculation unit 83 is smaller than or equal to the regenerable maximum value (S74/Y), the regenerative execution braking force calculation unit 88 turns on the regenerative trust flag, and takes, as regenerative execution torque, one of the regenerative request torque and a boundary value obtained by adding a predetermined threshold value to the regenerative execution torque of the previous time, the one being smaller than the other (S76).

The regenerative execution braking force calculation unit 88 determines whether the regenerative trust flag has been switched (S80). When the regenerative trust flag has been switched (S80/Y), the regenerative execution braking force calculation unit 88 newly calculates the difference Δ obtained by subtracting the regenerative execution torque of this time from the regenerative execution torque of the previous time, and then calculates the gradual-change difference dΔ obtained by dividing the difference Δ by the number of gradual changes (S82). Each of the newly calculated difference Δ and gradual-change difference dΔ has a positive/negative sign. For example, when the newly calculated difference Δ is positive, a target braking force is on the decrease by returning the brake pedal, and the addition to regenerative request torque is not executed. The number of gradual changes may be defined based on the control cycle and response delay period of time of the target fluid pressure calculation unit 89.

The regenerative execution braking force calculation unit 88 calculates the difference Δ of this time by subtracting the gradual-change difference dΔ from the calculated difference Δ (S84). When the regenerative trust flag has not been switched (S80/N), the regenerative execution braking force calculation unit 88 calculates the difference Δ of this time by subtracting the gradual-change difference dΔ from the difference Δ of the previous time (S84).

The regenerative execution braking force calculation unit 88 determines whether the sign of the calculated difference Δ of this time is positive (S86). That is, the calculation unit determines whether a target braking force becomes small by the regenerative execution torque is of this time becoming smaller than that of the previous time, or whether the new difference Δ calculated in S82 is compensated by subtracting the gradual-change difference dΔ from the difference Δ.

When the sign of the calculated difference Δ of this time is positive (S86/Y), the regenerative execution braking force calculation unit 88 makes the difference Δ to be 0 (S88). The fact that the sign has become positive means that a target braking force has become small, or that the new difference Δ calculated in S82 has been compensated by being subjected to a gradually changing process. The regenerative execution braking force calculation unit 88 calculates regenerative execution torque by adding the difference Δ of this time, which is 0, to regenerative execution torque (S92).

When the sign of the calculated difference Δ of this time is not positive (S86/N), the regenerative execution braking force calculation unit 88 calculates regenerative execution torque by adding the difference Δ of this time to regenerative execution torque (S90).

The regenerative execution braking force calculation unit 88 calculates a regenerative execution braking force from the regenerative execution torque, while the target fluid pressure calculation unit 89 calculates a target fluid pressure braking force based on both the target braking force calculated by the target braking force calculation unit 82 and the regenerative execution braking force (S92). By executing the gradually changing process in this way, the difference between the regenerative execution torque of this time and that of the previous time can be reduced and a braking feeling can be made good.

It is noted that the present invention should not be limited to the aforementioned embodiments, and various variations such as design modifications or the like may be made thereto based on knowledge of a person skilled in the art, and embodiments including such variations can be encompassed by the present invention.

INDUSTRIAL APPLICABILITY

The present invention can be applied to brake control systems in which regenerative braking is used in combination.

The invention claimed is:
1. A brake control system comprising:
a friction brake unit that generates a friction braking force;
a regenerative brake unit that generates a regenerative braking force;
a brake controller that calculates a first regenerative target value based on a target braking force, the target braking force being a target of the braking force to be provided to a wheel, and the brake controller controlling the friction brake unit based on a friction target value, the friction target value being a target value of the friction braking force, calculated based on the target braking force and a regenerative execution value at which the regenerative brake unit executed generation based on the first regenerative target value; and
a regenerative controller that controls the regenerative brake unit based on the first regenerative target value,
wherein the brake controller calculates a second regenerative target value by inflating the first regenerative target value, the inflation of the first regenerative target value is calculated based on an inflation value that is determined based on a rate of change of the target braking force,
wherein the brake controller outputs the second regenerative target value when the first regenerative target value is increasing, the inflation value is calculated to be in proportion to the rate of change of the target braking force,
wherein the brake controller controls the friction brake unit based on a friction target value calculated based on the target braking force and a regenerative execution value at which the regenerative brake unit executed generation based on the second regenerative target value, and
wherein the regenerative controller controls the regenerative brake unit based on the second regenerative target value when the first regenerative target value is increasing.

2. The brake control system according to claim 1, wherein the brake controller adjusts the inflation value based on vehicle speed.

3. The brake control system according to claim 1, wherein when a predetermined period of time has elapsed after the inflation of the first regenerative target value was initiated, the brake controller reduces the inflation value.

4. The brake control system according to claim 1, wherein the brake controller supplies the first regenerative target value or the second regenerative target value to the regenerative controller to control the regenerative brake unit via the regenerative controller, the regenerative controller calculating the friction target value based on both the target braking force and a regenerative execution value at which the regenerative brake unit has executed based on the first regenerative target value or the second regenerative target value.

5. The brake control system according to claim 1, wherein the brake controller receives, from the regenerative controller, a regenerable maximum value, which indicates the maximum value at which braking can be executed by the regenerative brake unit, and takes the second regenerative target value as a regenerative execution value when the second regenerative target value, which is to be supplied to the regenerative controller, is smaller than or equal to the regenerable maximum value.

6. The brake control system according to claim 5, wherein when the second regenerative target value of a current time is smaller than a value obtained by adding a predetermined threshold value to the regenerative execution value of a previous time, the brake controller takes the second regenerative target value of the current time as the regenerative execution value of the current time.

7. The brake control system according to claim 6, wherein when determining that the regenerative execution value of the previous time is equal to the second regenerative target value supplied to the regenerative controller in the past within a predetermined period of time, the brake controller takes the second regenerative target value as the regenerative execution value.

8. The brake control system according to claim 7, wherein the brake controller executes a changing process so as to reduce the difference between the regenerative execution value of a most recent time and that of the previous time, so that the friction target value is calculated based on the regenerative execution value obtained by interpolating the regenerative execution value of the most recent time and that of the previous time with the changing process.

* * * * *